United States Patent
van Petegem et al.

(10) Patent No.: US 8,950,493 B2
(45) Date of Patent: Feb. 10, 2015

(54) METHOD AND SYSTEM USING ZETA POTENTIAL ALTERING COMPOSITIONS AS AGGREGATING REAGENTS FOR SAND CONTROL

(75) Inventors: Ronald van Petegem, Montgomery, TX (US); Sarkis R. Kakadjian, San Antonio, TX (US); Frank Zamora, San Antonio, TX (US)

(73) Assignee: Weatherford Technology Holding LLC, Houston, TX (US)

( * ) Notice: Subject to any disclaimer, the term of this patent is extended or adjusted under 35 U.S.C. 154(b) by 477 days.

(21) Appl. No.: 12/690,292

(22) Filed: Jan. 20, 2010

(65) Prior Publication Data

US 2010/0212905 A1 Aug. 26, 2010

Related U.S. Application Data

(60) Continuation-in-part of application No. 12/151,429, filed on May 6, 2008, now Pat. No. 7,956,017, which is a division of application No. 11/298,547, filed on Dec. 9, 2005, now Pat. No. 7,392,847, application No.
(Continued)

(51) Int. Cl.
| | |
|---|---|
| E21B 43/00 | (2006.01) |
| E21B 43/26 | (2006.01) |
| C09K 8/528 | (2006.01) |
| C09K 8/506 | (2006.01) |
| C09K 8/68 | (2006.01) |

(Continued)

(52) U.S. Cl.
CPC . *C09K 8/506* (2013.01); *C09K 8/68* (2013.01); *C09K 8/80* (2013.01); *E21B 43/025* (2013.01); *E12B 43/267* (2013.01);

USPC .................. 166/308.2; 166/54.1; 507/236

(58) Field of Classification Search
CPC ............ C09K 8/528; C09K 8/72; C09K 8/62; C09K 8/68; C02F 5/14; E21B 43/26; E21B 43/14; E21B 43/122
USPC ................. 507/204, 205, 236, 245, 269, 271; 166/280.1, 280.2, 308.2, 54.1
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,805,958 A | 7/1959 | Bueche et al. | 106/308 |

(Continued)

FOREIGN PATENT DOCUMENTS

| | | |
|---|---|---|
| CA | 2125513 | 1/1995 |
| DE | 4027300 | 5/1992 |

(Continued)

OTHER PUBLICATIONS

U.S. Appl. No. 12/750,335, filed Mar. 30, 2010, Parker.
(Continued)

*Primary Examiner* — Susannah Chung
*Assistant Examiner* — Atnaf Admasu
(74) *Attorney, Agent, or Firm* — Robert W Strozier

(57) ABSTRACT

Methods and systems are disclosed for well completion and/or production, where an aggregating, agglomerating or conglomerating composition is injected into a producible formation, zone or interval thereof to alter an aggregation or zeta potential of formation surfaces and particulate to increase a maximum sand free production rate.

9 Claims, 8 Drawing Sheets

Related U.S. Application Data

12/690,292, filed on Jan. 20, 2010, which is a continuation-in-part of application No. 12/075,461, filed on Mar. 11, 2008, now Pat. No. 7,829,510, which is a division of application No. 11/298,556, filed on Dec. 9, 2005, now Pat. No. 7,350,579.

(60) Provisional application No. 61/146,386, filed on Jan. 22, 2009.

(51) Int. Cl.
  *C09K 8/80* (2006.01)
  *E21B 43/02* (2006.01)

(56) References Cited

U.S. PATENT DOCUMENTS

| | | | |
|---|---|---|---|
| 3,059,909 A | 10/1962 | Wise | 261/39.3 |
| 3,088,520 A | 5/1963 | Hildebrandt | |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,729,052 A | 4/1973 | Caldwell | |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Walles et al. | 166/300 |
| 4,748,011 A | 5/1988 | Baize | 423/228 |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |
| 5,082,579 A | 1/1992 | Dawson | 507/211 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,224,546 A | 7/1993 | Smith et al. | 166/300 |
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,330,005 A | 7/1994 | Card et al. | 166/280.2 |
| 5,342,530 A | 8/1994 | Aften et al. | 252/8.551 |
| 5,347,004 A | 9/1994 | Rivers et al. | 544/180 |
| 5,363,919 A | 11/1994 | Jennings, Jr. | 166/308.1 |
| 5,402,846 A | 4/1995 | Jennings, Jr. et al. | 166/259 |
| 5,411,091 A | 5/1995 | Jennings, Jr. | 166/280.1 |
| 5,424,284 A | 6/1995 | Patel et al. | 507/129 |
| 5,439,055 A | 8/1995 | Card et al. | 166/280.2 |
| 5,462,721 A | 10/1995 | Pounds et al. | 423/226 |
| 5,465,792 A | 11/1995 | Dawson et al. | 166/295 |
| 5,472,049 A | 12/1995 | Chaffee et al. | 166/250.1 |
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,551,516 A | 9/1996 | Norman et al. | 166/308.2 |
| 5,614,010 A * | 3/1997 | Smith et al. | 106/285 |
| 5,624,886 A | 4/1997 | Dawson et al. | 507/217 |
| 5,635,458 A | 6/1997 | Lee et al. | 507/240 |
| 5,649,596 A | 7/1997 | Jones et al. | 166/300 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,722,490 A | 3/1998 | Ebinger | 166/281 |
| 5,744,024 A | 4/1998 | Sullivan, III et al. | 208/236 |
| 5,755,286 A | 5/1998 | Ebinger | 166/281 |
| 5,775,425 A | 7/1998 | Weaver et al. | 166/276 |
| 5,787,986 A | 8/1998 | Weaver et al. | 166/280.2 |
| 5,806,597 A | 9/1998 | Tjon-Joe-Pin et al. | 166/300 |
| 5,807,812 A | 9/1998 | Smith et al. | 507/238 |
| 5,833,000 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,877,127 A | 3/1999 | Card et al. | 507/273 |
| 5,908,073 A | 6/1999 | Nguyen et al. | 166/276 |
| 5,908,814 A | 6/1999 | Patel et al. | 507/131 |
| 5,964,295 A | 10/1999 | Brown et al. | 166/308.2 |
| 5,979,557 A | 11/1999 | Card et al. | 166/300 |
| 5,980,845 A | 11/1999 | Cherry | 423/229 |
| 6,016,871 A | 1/2000 | Burts, Jr. | 166/300 |
| 6,035,936 A | 3/2000 | Whalen | 166/308.5 |
| 6,047,772 A | 4/2000 | Weaver et al. | 166/276 |
| 6,054,417 A | 4/2000 | Graham et al. | 507/238 |
| 6,059,034 A | 5/2000 | Rickards et al. | 166/280.2 |
| 6,060,436 A | 5/2000 | Snyder et al. | 507/266 |
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,228,812 B1 | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |

(56) References Cited

U.S. PATENT DOCUMENTS

| | | | |
|---|---|---|---|
| 7,140,433 B2 | 11/2006 | Gatlin et al. | 166/250.01 |
| 7,268,100 B2 | 9/2007 | Kippie et al. | 507/244 |
| 7,350,579 B2 | 4/2008 | Gatlin et al. | 166/308.3 |
| 7,392,847 B2 | 7/2008 | Gatlin et al. | 166/280.2 |
| 7,517,447 B2 | 4/2009 | Gatlin | 208/236 |
| 7,565,933 B2 | 7/2009 | Kippie et al. | |
| 7,566,686 B2 | 7/2009 | Kippie et al. | 507/213 |
| 7,712,535 B2 | 5/2010 | Venditto et al. | |
| 7,767,628 B2 | 8/2010 | Kippie et al. | 507/102 |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2005/0250666 A1 | 11/2005 | Gatlin et al. | 510/492 |
| 2006/0194700 A1 | 8/2006 | Gatlin et al. | 507/203 |
| 2007/0032693 A1 | 2/2007 | Gatlin et al. | 507/239 |
| 2007/0131425 A1 | 6/2007 | Gatlin et al. | |
| 2007/0173413 A1 | 7/2007 | Lukocs et al. | 507/238 |
| 2007/0173414 A1 | 7/2007 | Wilson, Jr. | 507/131 |
| 2008/0197085 A1 | 8/2008 | Wanner et al. | |
| 2008/0251252 A1 | 10/2008 | Schwartz | |
| 2008/0257553 A1 | 10/2008 | Gatlin et al. | 166/280.2 |
| 2008/0257554 A1 | 10/2008 | Zamora et al. | |
| 2008/0269082 A1 | 10/2008 | Wilson, Jr. et al. | |
| 2008/0283242 A1 | 11/2008 | Ekstrand et al. | |
| 2008/0287325 A1 | 11/2008 | Thompson et al. | |
| 2008/0314124 A1 | 12/2008 | Sweeney et al. | |
| 2008/0318812 A1 | 12/2008 | Kakadjian et al. | |
| 2009/0067931 A1 | 3/2009 | Curr et al. | |
| 2009/0151959 A1 | 6/2009 | Darnell et al. | |
| 2009/0200027 A1 | 8/2009 | Kakadjian et al. | |
| 2009/0200033 A1 | 8/2009 | Kakadjian et al. | |
| 2009/0203553 A1 | 8/2009 | Gatlin et al. | |
| 2009/0250659 A1 | 10/2009 | Gatlin | 208/236 |
| 2010/0000795 A1 | 1/2010 | Kakadjian | |
| 2010/0012901 A1 | 1/2010 | Falana et al. | |
| 2010/0077938 A1 | 4/2010 | Zamora et al. | |
| 2010/0122815 A1 | 5/2010 | Zamora et al. | |
| 2010/0181071 A1 | 7/2010 | van Petegen | |
| 2010/0197968 A1 | 8/2010 | Falana et al. | |
| 2010/0252262 A1 | 10/2010 | Ekstrand et al. | |

FOREIGN PATENT DOCUMENTS

| | | |
|---|---|---|
| GB | 775376 | 10/1954 |
| GB | 1073338 A | 6/1967 |
| JP | 10001461 | 6/1988 |
| JP | 08151422 | 11/1996 |
| JP | 10110115 A | 4/1998 |
| JP | 2005194148 A | 7/2005 |
| WO | WO 98/56497 | 12/1998 |
| WO | WO 99/05385 A2 | 2/1999 |

OTHER PUBLICATIONS

U.S. Appl. No. 12/473,805, filed May 28, 2009, Falana et al.
PCT ISR.

* cited by examiner

METHOD AND SYSTEM USING ZETA POTENTIAL ALTERING COMPOSITIONS AS AGGREGATING REAGENTS FOR SAND CONTROL

RELATED APPLICATIONS

This application claims the benefit of and priority of U.S. Provisional Patent Application Ser. No. 61/146,386, filed Jan. 22, 2009, is a continuation-in-part of U.S. patent application Ser. No. 12/151,429, filed May 6, 2008 now U.S. Pat. No. 7,956,017, which is a divisional of U.S. patent application Ser. No. 11/298,547, filed Dec. 9, 2005, published as 2007/0131425 on Jun. 14, 2007, now U.S. Pat. No. 7,392,847, issued Jul. 1, 2008, and is a continuation-in-part to U.S. patent application Ser. No. 12/075,461, filed Mar. 11, 2008, published as 2009/0203553 on Aug. 13, 2009, now U.S. Pat. No. 7,829,510, issued on Nov. 9, 2010, which is a divisional of U.S. patent application Ser. No. 11/298,556, filed Dec. 9, 2005, published as 2007/0131422 on Jun. 14, 2007, now U.S. Pat. No. 7,350,579, issued Apr. 1, 2008.

BACKGROUND OF THE INVENTION

1. Field of the Invention

Embodiments of the present invention relates to methods and systems for altering an aggregation and/or zeta potential of a producible formation or a zone thereof or an injection formation or zone thereof during drilling, completion, production, injection and/or during fracturing or post production stimulations operations, where the composition reduces or eliminates co-production of formation particulate or intrusion of formation particulate into the formation during injection.

More particularly, embodiments of the present invention relates to methods for altering the aggregation and/or zeta potential of a producible formation or a zone thereof during drilling, completion, production and/or during fracturing or post production stimulations operations, where the operations include treating the formation or a zone thereof with an effective amount of an aggregating, agglomerating or conglomerating composition sufficient to alter an aggregation and/or zeta potential of formation surfaces and/or particles to reduce or eliminate co-production of formation particulate.

2. Description of the Related Art

Many producing wells produce formation particulate including sand during its production lifetime. The co-production of formation particulate is very costly for the operator and hard on production equipment. Moreover, some wells after a gravel pack or fracture pack operation, produce formation fines, gravel, and/or proppant. Varies methods to address these problem have been discovered and implemented including, for example, gravel pack, frac pack, expandable screens, stand alone screens, horizontal gravel pack, chemical sand consolidation, etc. However, all have different advantages and disadvantages.

Although numerous methods exist to handle, generally minimize, the co-production of formation particulate from a producing formation or the intrusion of formation particulate into an injection formation, there is still a need in the art for methods and systems that permit production of well with reduced co-production of formation particulate or injection into injection formation with less co-injection of formation particulate.

DEFINITIONS

The term formation particulate means any solid material such as sand, formation fines, proppant, etc. that is co-produced with production fluid when an oil and/or gas well is placed on production after completion.

The term MSFR means maximum sand free production rate, which is the maximum production rate that can be achieved in a well without the co-production of sand or formation particulate.

The term cavitation or cavitating means to form cavities around production tubing, casing or cemented casing, i.e., to produce a volume free of sand surrounding the production tubing, casing or cemented casing.

The term cavitated formation is a formation having a cavity or cavities surrounding surrounding the production tubing, casing or cemented casing.

The term draw down pressure means a reduction in a pressure that is required to move the content, such as but not limited to, oil, gas and/or water, of the formation or zone into the casing, liner or tubing.

The term critical draw down pressure means the reduction in a pressure that is required to produce formation particulate, such as but not limited to, silica, clay, sand, and/or fines, into the casing or liner or tubing.

The term aggregated, agglomerated or conglomerated formation means that the weakly consolidated, semi-consolidated or unconsolidated formation has been treated with an aggregation, agglomeration, or conglomeration composition so that the formation is stable enough to produce below its critical draw down pressure without collapse.

The term relative draw down pressure means draw down pressure per unit area of the producible formation or zone.

The term substantially particulate free or other similar usage means that the produced fluids have less than 5 wt. % particulate. In certain embodiments, the term means that the produced fluids have less than 2.5 wt. % particulate. In certain embodiments, the term means that the produced fluids have less than 1 wt. % particulate. In certain embodiments, the term means that the produced fluids have less than 0.5 wt. % particulate. In certain embodiments, the term means that the produced fluids have less than 0.1 wt. % particulate.

The term producible or producing formation or zone thereof is an underground formation from which oil and/or gas is extracted.

The term injectible or injection formation or zone thereof is an underground formation into which materials can be injected for long term storage.

SUMMARY OF THE INVENTION

General Methods

Embodiments of the present invention provide methods for treating formations that can be used during drilling operations, completion operations, sand control operations, fracturing operations, production operations, production enhancement operations, or any other formation operation, where the treatments are designed to change, alter and/or augment an aggregation and/or zeta potential of formation surfaces and/or formation particulate to reduce co-production of formation particulate from a producible formation or a zone thereof.

Embodiments of the present invention provide systems for treating formations that can be used during drilling operations, completion operations, sand control operations, fracturing operations, production operations, production enhancement operations, or any other formation operation, where the treatments are designed to change, alter and/or augment an aggregation and/or zeta potential of formation surfaces and/or formation particulate to reduce co-production of formation particulate from a producible formation or a zone thereof.

Embodiments of the present invention provide methods for treating formations that can be used during drilling operations, completion operations, sand control operations, fracturing operations, injection operations, or any other formation operation, where the treatments are designed to change, alter and/or augment an aggregation and/or zeta potential of formation surfaces and/or formation particulate to reduce co-injection of formation particulate from an injection formation or a zone thereof.

Embodiments of the present invention provide systems for treating formations that can be used during drilling operations, completion operations, sand control operations, fracturing operations, injection operations, or any other formation operation, where the treatments are designed to change, alter and/or augment an aggregation and/or zeta potential of formation surfaces and/or formation particulate to reduce co-injection of formation particulate from an injection formation or a zone thereof.

Method for Treating

The present invention provides a method for changing an aggregation potential or propensity of a particulate solid material such as a metal oxide-containing solid, where the method includes the step of contacting the particulate solid material with a composition including an amine and a phosphate ester under conditions sufficient for the amine and phosphate ester to react forming a partial or complete coatings on surfaces of particulate solid material.

Methods for Using the Treating Methods

Fracturing

The present invention provides a method for fracturing a formation including the step of pumping a fracturing fluid including a proppant into a producible formation at a pressure sufficient to fracture the formation and to enhance productivity, where the proppant props open the formation after fracturing and where the proppant comprises a particulate solid treated with a treating composition comprising an amine and a phosphate ester under conditions sufficient for the amine and phosphate ester to react forming a partial or complete coating on surfaces of particulate solid material.

The present invention provides a method for fracturing a formation including the step of pumping a fracturing fluid including a proppant and an aggregating composition of this invention into a producible formation at a pressure sufficient to fracture the formation and to enhance productivity. The composition results in a modification of an aggregation propensity, and/or zeta-potential of the proppant, formation particles and formation surfaces so that the formation particles and/or proppant aggregate and/or cling to the formation surfaces.

The present invention provides a method for fracturing a formation including the step of pumping a fracturing fluid including an aggregating composition of this invention into a producible formation at a pressure sufficient to fracture the formation and to enhance productivity. The composition results in a modification of an aggregation propensity, potential and/or zeta-potential of the formation particles and formation surfaces so that the formation particles aggregate and/or cling to the formation surfaces. The method can also include the step of pumping a proppant comprising a coated particulate solid composition of this invention after fracturing so that the coated particles prop open the fracture formation and tend to aggregate to the formation surfaces and/or formation particles formed during fracturing.

Drilling

The present invention provides a method for drilling including the step of while drilling, circulating a drilling fluid, to provide bit lubrication, heat removal and cutting removal, where the drilling fluid includes an aggregating composition of this invention. The composition increases an aggregation potential or propensity and/or alters a zeta potential of any particulate metal oxide-containing solid in the drilling fluid or that becomes entrained in the drilling fluid to increase solids removal. The method can be operated in over-pressure conditions or under-balanced conditions or under managed pressure conditions. The method is especially well tailored to under-balanced or managed pressure conditions.

The present invention provides a method for drilling including the step of while drilling, circulating a first drilling fluid to provide bit lubrication, heat removal and cutting removal. Upon encountering an underground structure that produces undesirable quantities of particulate solids, changing the first drilling fluid to a second drilling fluid including a composition of this invention to provide bit lubrication, heat removal and cutting removal and to increase an aggregation potential or decrease the absolute value of the zeta potential of any particulate solids in the drilling fluid or that becomes entrained in the drilling fluid to increase solids removal. The method can be operated in over-pressure conditions or under-balanced conditions or under managed pressure conditions. The method is especially well tailored to under-balanced or managed pressure conditions.

The present invention provides a method for drilling including the step of while drilling, circulating a first drilling fluid to provide bit lubrication, heat removal and cutting removal. Upon encountering an underground structure that produces undesirable quantities of particulate solids, changing the first drilling fluid to a second drilling fluid including a composition of this invention to provide bit lubrication, heat removal and cutting removal and to increase an aggregation potential or decrease in the absolute value of the zeta potential of any particulate solids in the drilling fluid or that becomes entrained in the drilling fluid to increase solids removal. After passing through the structure that produces an undesired quantities of particulate solids, change the second drilling fluid to the first drilling fluid or a third drilling fluid. The method can be operated in over-pressure conditions or under-balanced conditions or under managed pressure conditions. The method is especially well tailored to under-balanced or managed pressure conditions.

Producing

The present invention provides a method for producing including the step of circulating and/or pumping a fluid into a well on production, where the fluid includes a composition of this invention, which increases an aggregation potential or decreases the absolute value of the zeta potential of any particulate solid in the fluid or that becomes entrained in the fluid to increase solid particle removal and to decrease the potential of the particles to plug the formation and/or the production tubing.

The present invention also provides a method for controlling sand or fines migration including the step of pumping a fluid including a composition of this invention through a matrix at a rate and pressure into a formation to control sand and fine production or migration into the production fluids.

The present invention also provide another method for controlling sand or fines migration including the step of depositing a coated particulate solid material of this invention adjacent screen-type sand and fines control devices so that the sand and/or fines are attracted to the coated particles and do not encounter or foul the screen of the screen-type device.

Injecting

The present invention provides a method for injecting including the step of circulating and/or pumping a fluid into an injection well, where the fluid includes a composition of this invention, which increases an aggregation potential or decreases the absolute value of the zeta potential of any particulate solid in the fluid or that becomes entrained in the fluid to increase solid particle removal and to decrease the potential of the particles to plug the formation.

The present invention also provides a method for controlling sand or fines migration including the step of pumping a fluid including a composition of this invention through a matrix at a rate and pressure into a formation to control sand and fine production or migration into the formation during fluid injection.

The present invention also provide another method for controlling sand or fines migration including the step of depositing a coated particulate solid material of this invention adjacent screen-type sand and fines control devices so that the sand and/or fines are attracted to the coated particles and do not encounter or foul the screen of the screen-type device.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Original Disclosure

Figure 1:
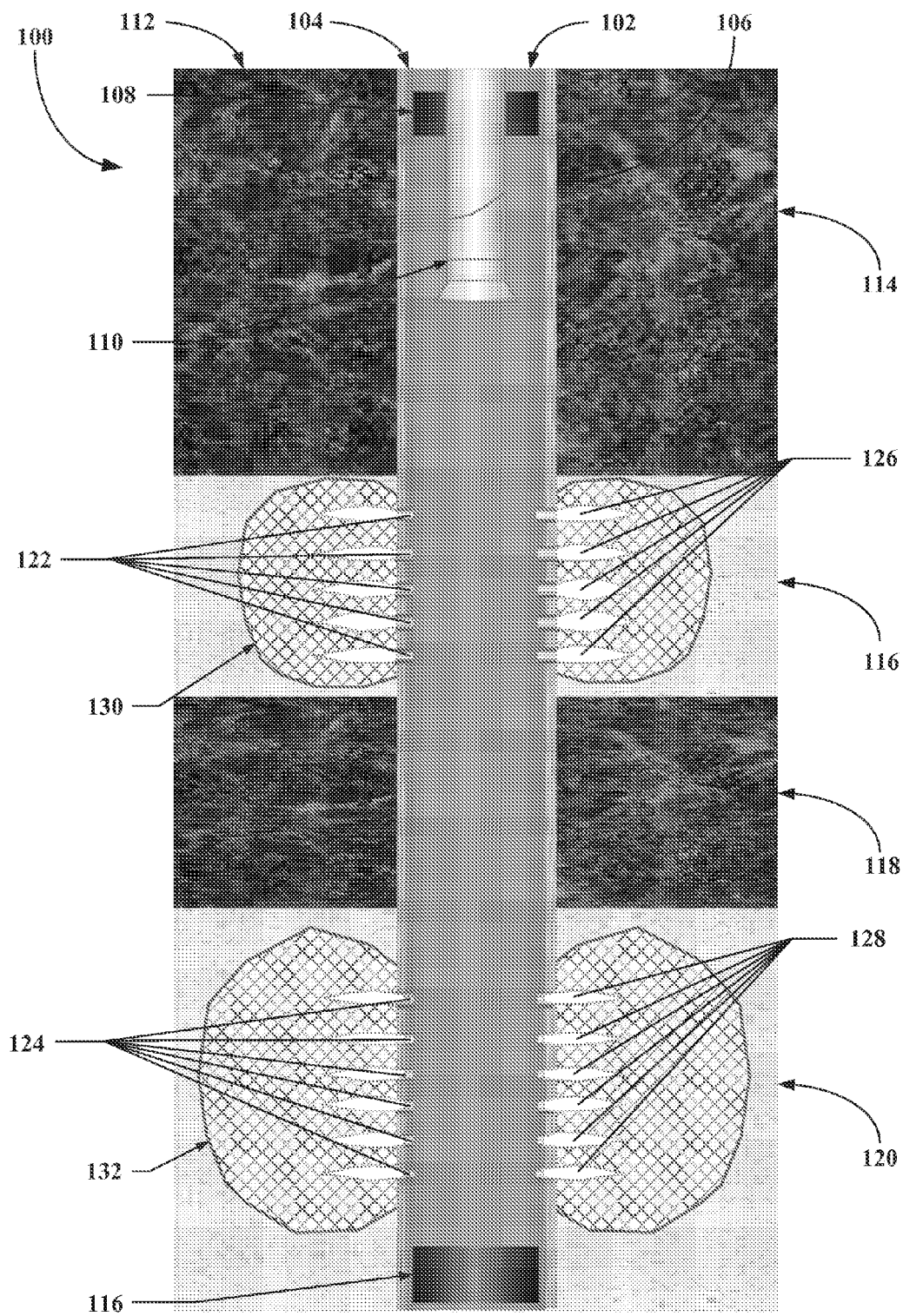
FIG. 1 depicts an embodiment of a method and system for treating two zones of a producible formation of a cased bore hole through perforations with an aggregating, agglomerating or conglomerating composition of this invention.

The inventors have found that a composition can be produced that, when added to a particulate metal-oxide-containing solid or other solid materials or to a suspension or dispersion including a particulate metal-oxide-containing solid or other solid materials, the particles are modified so that an aggregation propensity, aggregation potential and/or a zeta potential of the particles are altered. The inventors have also found that metal-oxide-containing solid particles or other solid particles can be prepared having modified surfaces or portions thereof, where the modified particles have improved aggregation tendencies and/or propensities and/or alter particle zeta potentials. The inventors have also found that the compositions and/or the modified metal-oxide-containing solid or other solid particles can be used in oil field applications including drilling, fracturing, producing, injecting, sand control, or any other downhold application. The inventors have also found that the modified particulate metal-oxide-containing solid particles or particles of any other solid material can be used in any other application where increased particle aggregation potentials are desirable or where decreased absolute values of the zeta potential of the particles, which is a measure of aggregation propensity. The inventors have also found that a coated particulate metal-oxide-containing solid compositions can be formed, where the coating is deformable and the coated particles tend to self-aggregate and tend to cling to surfaces having similar coatings or having similar chemical and/or physical properties to that of the coating. That is to say, that the coated particles tend to prefer like compositions, which increase their self-aggregation propensity and increase their ability to adhere to surface that have similar chemical and/or physical properties. The inventors have found that the coating compositions of this invention are distinct from known compositions for modifying particle aggregation propensities and that the coated particles are ideally suited as proppants, where the particles have altered zeta potentials that change the charge on the particles causing them to attract and agglomerate. The change in zeta potential or aggregation propensity causes each particle to have an increased frictional drag keeping the proppant in the fracture. The compositions are also ideally suited for decreasing fines migrating into a fracture pack or to decrease the adverse impact of fines migration into a fractured pack.

In the case of drilling, the compositions of this invention can be used to coat the formation and formation cuttings during drilling, because the particle tend to self aggregate and/or cling to similar modified formation surfaces. Again, an advantage of the self-aggregation is a reduced tendency of the cuttings to foul or plug screens. Additional advantages are to coat the formation walls with a composition of this invention during drilling to consolidate the formation and to consolidate or aggregate fines or particles in the drilling fluid to keep the rheological properties of the drilling fluid from changing and increasing equivalent circulating density (ECD).

Compositions

The invention broadly relates to a composition including an amine and a phosphate ester. The composition modifies surfaces of solid materials or portions thereof altering the chemical and/or physical properties of the surfaces. The altered properties permit the surfaces to become self attracting or to permit the surfaces to be attractive to material having similar chemical and/or physical properties. In the case of particles including metal oxide particles such as particles of silica, alumina, titania, magnesia, zirconia, other metal oxides or oxides including a mixture of these metal oxides (natural or synthetic), the composition forms a complete or partial coating on the surfaces of the particles. The coating can interact with the surface by chemical and/or physical interactions including, without limitation, chemical bonds, hydrogen bonds, electrostatic interactions, dipolar interactions, hyperpolarizability interactions, cohesion, adhesion, adherence, mechanical adhesion or any other chemical and/or physical interaction that allows a coating to form on the particles. The coated particles have a greater aggregation or agglomeration propensity than the uncoated particles. Thus, the particles before treatment may be free flowing, while after coating are not free flowing, but tend to clump, aggregate or agglomerate. In cases, where the composition is used to coat surfaces of a geological formation, a synthetic metal oxide structure and/or metal-oxide containing particles, the particles will not only tend to aggregate together, the particles also will tend to cling to the coated formation or structural surfaces.

Treated Structures and Substrates

The present invention also broadly relates to structures and substrates treated with a composition of this invention, where the structures and substrates include surfaces that are partially or completely coated with a composition of this invention. The structures or substrates can be ceramic or metallic or fibrous. The structures or substrates can be spun such as a glass wool or steel wool or can be honeycombed like catalytic converters or the like that include channels that force fluid to flow through tortured paths so that particles in the fluid are forced in contact with the substrate or structured surfaces. Such structures or substrates are ideally suited as particulate filters or sand control media.

Methods for Treating Particulate Solids

The present invention broadly relates to a method for treating metal oxide-containing surfaces including the step of contacting the metal oxide-containing surface with a composition of this invention. The composition forms a coating on the surface altering the properties of the surface so that the surface is now capable to interacting with similarly treated surfaces to form agglomerated and/or aggregated structures. The treating can be designed to coat continuous metal oxide containing surfaces and/or the surfaces of metal oxide containing particles. If both are treated, then the particles cannot only self-aggregate, but the particles can also aggregate, agglomerate and/or cling to the coted continuous surfaces. The compositions can be used in fracturing fluids, in drilling fluids, in completion fluids, in sand control applications or any other downhole application. Additionally, the coated particles can be used in fracturing fluids. Moreover, structures, screens or filters coated with the compositions of this invention can be used to attract and remove fines that have been modified with the compositions of this invention.

Method for Fracturing and/or Propping

The present invention broadly relates to methods for fracturing a formation including the step of pumping a fracturing fluid including a composition of this invention into a producible formation or zone at a pressure sufficient to fracture the formation. The composition modifies an aggregation potential and/or zeta-potential of formation particles and formation surfaces during fracturing so that the formation particles aggregate and/or cling to the formation surfaces or each other increasing fracturing efficiency and increasing productivity of the fracture formation. The composition of this invention can also be used in a pre-pad step to modify the surfaces of the formation so that during fracturing the formation surfaces are pre-coated. The prepad step involves pumping a fluid into the formation ahead of the treatment to initiate the fracture and to expose the formation face with fluids designed to protect the formation. Beside just using the composition as part of the fracturing fluid, the fracturing fluid can also include particles that have been prior treated with the composition of this invention, where the treated particles act as proppants to prop open the formation after fracturing. If the fracturing fluid also includes the composition, then the coated particle proppant will adhere to formation surfaces to a greater degree than would uncoated particle proppant.

In an alternate embodiment of this invention, the fracturing fluid includes particles coated with a composition of this invention as proppant. In this embodiment, the particles have a greater self-aggregation propensity and will tend to aggregate in locations that may most need to be propped open. In all fracturing applications including proppants coated with or that become coated with the composition of this invention during fracturing, the coated proppants are likely to have improved formation penetration and adherence properties. These greater penetration and adherence or adhesion properties are due not only to a difference in the surface chemistry of the particles relative to the surface chemistry of un-treated particles, but also due to a deformability of the coating itself. Thus, the inventors believe that as the particles are being forced into the formation, the coating will deform to allow the particles to penetrate into a position and as the pressure is removed the particles will tend to remain in place due to the coating interaction with the surface and due to the relaxation of the deformed coating. In addition, the inventors believe that the altered aggregation propensity of the particles will increase proppant particle density in regions of the formation most susceptible to proppant penetration resulting in an enhance degree of formation propping.

Method for Drilling

The present invention also broadly relates to a method for drilling including the step of, while drilling, circulating a drilling fluid to provide bit lubrication, heat removal and cutting removal, where the drill fluid includes a composition of this invention, which increases an aggregation potential or decrease an absolute value of the zeta potential of any particulate solids in the drilling fluid or that becomes entrained in the drilling fluid to increase solids removal.

The present invention also broadly relates to a method for drilling including the step of while drilling, circulating a first drilling fluid to provide bit lubrication, heat removal and cutting removal. Upon encountering an underground structure that produces undesirable quantities of particulate solids including metal oxide-containing solids, changing the first drilling fluid for a second drilling fluid including a composition of this invention to provide bit lubrication, heat removal and cutting removal and to increase an aggregation potential or decrease an absolute value of the zeta potential of any solid including particulate metal oxide-containing solids in the drilling fluid or that becomes entrained in the drilling fluid to increase solids removal.

The present invention also broadly relates to a method for drilling including the step of, while drilling, circulating a first drilling fluid to provide bit lubrication, heat removal and cutting removal. Upon encountering an underground structure that produces undesirable quantities of particulate including metal oxide-containing solids, changing the first drilling fluid for a second drilling fluid including a composition of this invention to provide bit lubrication, heat removal and cutting removal and to increase an aggregation potential or zeta potential of any particulate solid including metal oxide-containing solid in the drilling fluid or that becomes entrained in the drilling fluid to increase solids removal. After passing through the structure that produces an undesired quantities of particulate metal oxide-containing solids, change the second drilling fluid for the first drilling fluid or a third drilling fluid.

Method for Producing

The present invention also broadly relates to a method for producing including the step of circulating and/or pumping a fluid into, where the fluid includes a composition of this invention, which increases an aggregation potential or decreases an absolute value of the zeta potential of any particulate solid including a metal oxide-containing solid in the fluid or that becomes entrained in the fluid to increase solids removal and to decrease the potential of the particles plugging the formation and/or production tubing.

New Uses and Methods

The inventors have found that methods and systems for increasing productivity of oil and/or gas wells, while reducing the co-production of formation particulate can be implemented, where the treatment results in reduced permeability reduction after treatment (i.e., the formation maintains a higher permeability after treatment as compared to other conventional treatments, which decrease formation permeability to a higher extent), reduced risk of permanent reservoir damage, and reduced formation pore space plugging. The inventors have also found that the systems and methods also allow the treatment of long intervals, single trip perforation and conglomeration or conglomeration and consolidation, conglomeration re-treatments, and conglomeration treatments through tubing with or without coiled tubing.

Chemical Sand Control

Embodiments of the methods and systems of this invention relate to sand control, where an effective amount of an aggregation, agglomeration or conglomeration composition is injected into a producible formation or a zone thereof, where the composition alters an aggregation potential and/or a zeta potential of formation surfaces and/or formation particulate to chemically enhance particular aggregation, agglomeration or conglomeration within the formation or zone thereof and, thereby, reduce, substantially eliminate or eliminate co-production of formation particulate. The method includes placing an effective amount of the aggregation, agglomeration or conglomeration composition into an existing down hole producible formation or zone causing formation particulate to bind together and/or to bind to formation surfaces to form a conglomerated formation or zone thereof. After the conglomeration, the conglomerated formation can produce hydrocarbons and/or liquids at a higher substantially sand free rate and/or a higher sand free rate, thus, maximizing sand free production rates of the formation or zone. The composition can be injected into the formation or zone thereof using existing production tubing, liners or equipments or using a specially designed work string. Of course, the treatment can be directed into a plurality of zones of a producible formation, into a long interval of the formation or into the entire formation depending on the desired result to be achieved.

Enhanced Gravel or Fracture Packing

Embodiments of the methods and systems of this invention relate for gravel and/or fracture packing producible formations or zones therein, where the methods or systems include pre-treating, in-situ treating, and/or post treating the formation or zones thereof to enhance sand control or reduce formation particulate co-production of well undergoing a gravel packing and/or fracture packing operations. The treatment involves injecting into the formation or zones thereof, an effective amount of an aggregating, agglomerating or conglomerating composition sufficient to alter an aggregation potential and/or zeta potential of the formation or zone surfaces and formation particulate resulting in a reduction, substantial elimination or elimination of the co-production of formation particulate including sand, grains and/or fines. Gravel packing is a sand-control method used to prevent production of formation sand. In gravel pack operations, a steel screen is placed in the wellbore and the surrounding annulus packed with prepared gravel of a specific size designed to prevent the passage of formation particulate through the introduced gravel pack. The introduction of the prepared gravel results in a stabilization of the formation or zone thereof, while causing minimal impairment to well productivity. Fracture packing is a productivity enhancing operation, where a producible formation is fractured under pressure. During or after fracturing, a fluid including a proppant and generally a consolidation composition is injected into the formation to hold open the fractures permitting enhanced production. Traditional gravel packing and fracture packing, although useful in reducing formation particulate co-production, the migration of formation particulate is not fully inhibited and screen plugging and down stream equipment damage can still occur. However, such formation particulate co-production can be reduced, substantially eliminated or eliminated by treating with the conglomeration compositions of this invention before, during or after either gravel packing or fracture packing.

Enhance Expandable Screen Function in Open Hole

Embodiments of the methods and systems of this invention relate to methods and systems to enhance formation particulate co-production in completion operation involving the use of expandable screens in open hole wells. The method involve pre-treating, in-situ treating and/or post treating of a producible formation, an interval within the formation or zones within the formation with an effective amount of an aggregating, agglomerating or conglomerating composition sufficient to alter an aggregation potential and/or zeta potential of the formation or zone surfaces and formation particulate resulting in a reduction, substantial elimination or elimination of the co-production of formation particulate including sand, grains and/or fines. The reduction, substantial elimination or elimination of the co-production of formation particulate reduces screen plugging increasing screen lifetime and production lifetime at the same or higher relative draw down pressure.

Enhance Expandable Screen Function in Cased Hole

Embodiments of the methods and systems of this invention relate to methods and systems to enhance formation particulate co-production in completion operation involving the use of expandable screens in cased hole wells. The method involve pre-treating, in-situ treating and/or post treating of a producible formation, an interval within the formation or zones within the formation with an effective amount of an aggregating, agglomerating or conglomerating composition sufficient to alter an aggregation potential and/or zeta potential of the formation or zone surfaces and formation particulate resulting in a reduction, substantial elimination or elimination of the co-production of formation particulate including sand, grains and/or fines. The reduction, substantial elimination or elimination of the co-production of formation particulate reduces screen plugging increasing screen lifetime and production lifetime at the same or higher relative draw down pressure.

Enhance Stand Alone Screen Function in Open Hole

Embodiments of the methods and systems of this invention relate to methods and systems to enhance formation particulate co-production in completion operation involving the use of stand alone screens in open hole wells. The method involve pre-treating, in-situ treating and/or post treating of a producible formation, an interval within the formation or zones within the formation with an effective amount of an aggregating, agglomerating or conglomerating composition sufficient to alter an aggregation potential and/or zeta potential of the formation or zone surfaces and formation particulate resulting in a reduction, substantial elimination or elimination of the co-production of formation particulate including sand, grains and/or fines. The reduction, substantial elimination or elimination of the co-production of formation particulate reduces screen plugging increasing screen lifetime and production lifetime at the same or higher relative draw down pressure.

Enhance Stand Alone Screen Function in Cased Hole

Embodiments of the methods and systems of this invention relate to methods and systems to enhance formation particulate co-production in completion operation involving the use of stand alone screens in cased hole wells. The method involve pre-treating, in-situ treating and/or post treating of a producible formation, an interval within the formation or zones within the formation with an effective amount of an aggregating, agglomerating or conglomerating composition sufficient to alter an aggregation potential and/or zeta potential of the formation or zone surfaces and formation particulate resulting in a reduction, substantial elimination or elimination of the co-production of formation particulate including sand, grains and/or fines. The reduction, substantial elimination or elimination of the co-production of formation particulate reduces screen plugging increasing screen lifetime and production lifetime at the same or higher relative draw down pressure.

Systems and Methods for Well Completion

Embodiments of systems and methods of this invention relate to running a working string into a well including a producible formation or zone, where the working sting comprises a combination of jointed pipes and a selection of perforating gun(s), injection packer(s) and/or circulation control valve(s) to direct placement of an effective amount of an aggregating, agglomerating or conglomerating composition into a formation, where the effective amount is sufficient to alter an aggregation potential and/or zeta potential of the formation or zone surfaces and formation particulate resulting in a reduction, substantial elimination or elimination of the co-production of formation particulate including sand, grains and/or fines with or without pre- or post flush.

Embodiments of systems and methods of this invention relate to running coiled tubing into a well including a producible formation or zone, where the coiled tubing comprises a plurality of perforating gun(s), injection packer(s) and circulation control valve(s) to direct placement of an effective amount of an aggregating, agglomerating or conglomerating composition into a formation, where the effective amount is sufficient to alter an aggregation potential and/or zeta potential of the formation or zone surfaces and formation particulate resulting in a reduction, substantial elimination or elimination of the co-production of formation particulate including sand, grains and/or fines with or without pre- or post flush.

Embodiments of systems and methods of this invention relate to running coiled tubing into a well including a producible formation or zone in combination with one or a plurality of down hole tools to direct placement of an effective amount of an aggregating, agglomerating or conglomerating composition into a formation, where the effective amount is sufficient to alter an aggregation potential and/or zeta potential of the formation or zone surfaces and formation particulate resulting in a reduction, substantial elimination or elimination of the co-production of formation particulate including sand, grains and/or fines with or without pre- or post flush.

Embodiments of systems and methods of this invention relate to treating a well with an effective amount of an aggregating, agglomerating or conglomerating composition into a formation, where the effective amount is sufficient to alter an aggregation potential and/or zeta potential of the formation or zone surfaces and formation particulate resulting in a reduction, substantial elimination or elimination of the co-production of formation particulate including sand, grains and/or fines through existing production tubing.

Embodiments of systems and methods of this invention relate to completing a well into a producible formation or zone, by displacing the drilling fluid before, during or after drilling into the producible formation or zone with an effective amount of an aggregating, agglomerating or conglomerating composition into a formation, where the effective amount is sufficient to alter an aggregation potential and/or zeta potential of the formation or zone surfaces and formation particulate resulting in a reduction, substantial elimination or elimination of the co-production of formation particulate including sand, grains and/or fines.

General Principles of Aggregation, Agglomeration or Conglomeration

Chemical aggregation, agglomeration, or conglomeration is a formation treatment that is designed to convert weakly consolidated, semi consolidated or unconsolidated formations into conglomerated formations. The treatment composition is designed to partially or completely coat the particles of the formation changing their aggregation, agglomeration or conglomeration propensity or potential and/or zeta potential so that the particles tend to aggregate with sufficient strength to reduce or eliminate formation collapse or cave in during subsequent above critical draw down pressure production. Unlike consolidation compositions, these compositions do not interact with the formation particles to from a consolidated matrix, but merely forms conglomeration of particles, where the "bonds" between the particles can be broken and reformed under flow conditions. Under enhanced flow conditions, the "bonds" between the particles are broken and the dislodged particles are entrained in the fluid flow. In this way, material can be removed from the formation surrounding the well bore in desired zones of a producible formation without risking formation collapse or cave in during cavitation.

Amine/Phosphate Compositions

The invention broadly relates to a composition including an amine and a phosphate ester. The composition modifies surfaces of solid materials or portions thereof altering the chemical and/or physical properties of the surfaces. The altered properties permit the surfaces to become self attracting or to permit the surfaces to be attractive to material having similar chemical and/or physical properties. In the case of particles including metal oxide particles such as particles of silica, alumina, titania, magnesia, zirconia, other metal oxides or oxides including a mixture of these metal oxides (natural or synthetic), the composition forms a complete or partial coating on the surfaces of the particles. The coating can interact with the surface by chemical and/or physical interactions including, without limitation, chemical bonds, hydrogen bonds, electrostatic interactions, dipolar interactions, hyperpolarizability interactions, cohesion, adhesion, adherence, mechanical adhesion or any other chemical and/or physical interaction that allows a coating to form on the particles. The coated particles have a greater aggregation or agglomeration propensity than the uncoated particles. Thus, the particles before treatment may be free flowing, while after coating are not free flowing, but tend to clump, aggregate or agglomerate. In cases, where the composition is used to coat surfaces of a geological formation, a synthetic metal oxide structure and/or metal-oxide containing particles, the particles will not only tend to aggregate together, the particles also will tend to cling to the coated formation or structural surfaces.

Surface Acidifying and Modifying Compositions

The present invention provides a substrate including a metal oxide-containing solid surface treated with a treating composition, which imparts to the surface improved aggregating properties or improved particulate adherence or affinity properties, where the composition includes at least an acidifying agent and a surface modifying agent. The substrates are ideally suited for use in downhole applications.

Embodiments of the present invention provides a composition including: (1) a particulate metal oxide-containing solid surface acidifying agent; and (2) a particulate metal oxide-containing solid surface modifying agent. Other embodiments of the present invention provides a composition including: (1) a particulate metal oxide-containing solid surface acidifying agent; (2) a particulate metal oxide-containing solid surface modifying agent; and (3) a fluid carrier. Other embodiments of the present invention provides a composition including: (1) a particulate metal oxide-containing solid surface acidifying agent; (2) a particulate metal oxide-containing solid surface modifying agent; (3) an aggregation enhancing agent; and (4) fluid carrier. Other embodiments of the present invention provides a composition including: (1) a particulate metal oxide-containing solid surface acidifying agent; (2) a particulate metal oxide-containing solid surface modifying agent; (3) an aggregation enhancing agent; (4) a thickening agent; and (5) a fluid carrier. Other embodiments of the present invention provides a composition including: (1) a particulate metal oxide-containing solid surface acidifying agent; (2) a particulate metal oxide-containing solid surface modifying agent; and (3) a particulate metal oxide-containing solid surface exchange agent. Other embodiments of the present invention also provides a composition including: (1) a particulate metal oxide-containing solid surface acidifying agent; (2) a particulate metal oxide-containing solid surface modifying agent; (3) a particulate metal oxide-containing solid surface exchange agent; and (4) a fluid carrier. Other embodiments of the present invention also provides a composition including: (1) a particulate metal oxide-containing solid surface acidifying agent; (2) a particulate metal oxide-containing solid surface modifying agent; (3) a particulate metal oxide-containing solid surface exchange agent; and (4) an aggregation enhancing agent. Other embodiments of the present invention also provides a composition including: (1) a particulate metal oxide-containing solid surface acidifying agent; (2) a particulate metal oxide-containing solid surface modifying agent; (3) a particulate metal oxide-containing solid surface exchange agent; (4) an aggregation enhancing agent; and (5) a fluid carrier. Other embodiments of the present invention also provides a composition including: (1) a particulate metal oxide-containing solid surface acidifying agent; (2) a particulate metal oxide-containing solid surface modifying agent; (3) a particulate metal oxide-containing solid surface exchange agent; (4) an aggregation enhancing agent; and (5) a thickening agent. Other embodiments of the present invention also provides a composition including: (1) a particulate metal oxide-containing solid surface acidifying agent; (2) a particulate metal oxide-containing solid surface modifying agent; (3) a particulate metal oxide-containing solid surface exchange agent; (4) an aggregation enhancing agent; (5) a thickening agent; and (6) a fluid carrier. Other embodiments of the present invention provides an aqueous composition including: (1) a particulate metal oxide-containing solid surface acidifying agent; (2) a particulate metal oxide-containing solid surface modifying agent; and (3) a particulate metal oxide-containing solid surface exchange agent. Other embodiments of the present invention also provides an aqueous composition including: (1) a particulate metal oxide-containing solid surface acidifying agent; (2) a particulate metal oxide-containing solid surface modifying agent; (3) a particulate metal oxide-containing solid surface exchange agent; and (4) an aqueous carrier. Other embodiments of the present invention also provides an aqueous composition including: (1) a particulate metal oxide-containing solid surface acidifying agent; (2) a particulate metal oxide-containing solid surface modifying agent; (3) a particulate metal oxide-containing solid surface exchange agent; (4) an aggregation enhancing agent; and (5) an aqueous carrier. Other embodiments of the present invention also provides an aqueous composition including: (1) a particulate metal oxide-containing solid surface acidifying agent; (2) a particulate metal oxide-containing solid surface modifying agent; (3) a particulate metal oxide-containing solid surface exchange agent; (4) an aggregation enhancing agent; and (5) a thickening agent; and (6) an aqueous carrier.

General Principles of Consolidation

Chemical consolidation is a formation treatment that converts a weakly consolidated, semi consolidated or unconsolidated formation into a consolidated formation. The treatment is generally injected into the formation under pressures so that the consolidation chemical composition invades the formation, coating formation particles (e.g., sand) and allowing the particles to agglomerate or aggregate within the treated region of the formation. The treated region is now less susceptible to collapse if a portion of the formation is removed around that production tubing or equipment.

The formation consolidation chemical compositions for use in this invention are amine-phosphate ester compositions as compared to traditional chemical binders such as a resin or a polymer liquid resin, which operate by "gluing" the grains together to increase for the purpose of increasing the unconfined compressive strength (USC). The amine-phosphate ester compositions of this invention are generally pumped through perforation in the production tubing or casing or liner into pore spaces in the formation. While the present aggregating compositions of this invention can be used alone, chemical binders can be used in conjunction with or in addition to the compositions of this invention. The chemical binder coats the formation particles (e.g., sand grains). The formation is then subjected to an overflush to improve formation permeability. As the binder hardens, with or without a hardening agent, the weakly consolidated, semi consolidated or unconsolidated formation is converted into a consolidated formation, where the particles have been converted into a permeable synthetic sandstone. Formation consolidation is designed to strengthen the formation around the well bore so that drag forces of flowing production fluids at a desired production rate do not dislodge formation particles such as sand grains, reducing sand or particulate co-production.

The chemical binders (1) should not precipitate until enough time has elapsed to allow proper placement in the wellbore, (2) should be only a fraction of the total volume so that the sand will remain permeable, (3) should adhere strongly to the sand grains, (4) should have a short hardening or waiting time after placement, and (5) should be insensitive to minor variations in chemical purity or mixing procedures in all types of sand.

Chemistry of Resins

The resins generally used as chemical binders are solid, hard to soft, organic, non-crystalline products that have broader or narrower molecular weight distributions. The resins normally have a melting or softening range and are brittle in their solid state. Chemical resins are generally raw materials, for example for binders, curable molding composition adhesives and coatings. Resins are typically divided into two categories: 1) thermosetting resins and 2) thermoplastic resins. The consolidation chemicals for use in this invention can be either of these or combinations of one or more thermosetting and/or thermoplastic resins.

Process of Curing

The chemical binders, such as resins, are transformed from a liquid form into a 3D solid network through a cross-linking or curing. During the cross-linking process, small monomers or oligomer molecules are linked together into clusters via chemical bonds, which can be hydrogen bonding, electrostatic interactions, ionic bonding, and/or covalent bonding. These clusters aggregate to form larger clusters until a network is formed that spans the reacting mass. During cluster build-up, viscosity increase can be modeled by an extension of Stoke's law of viscosity. As viscosity increase due to the increased cluster size, cluster movement become restricted. At the so-called gel point, the cross-linked or cured network spans the entire reacting mass and large-scale movement is no longer possible. The time or point at which this occurs is called the gel time. At this point, the viscosity of the fluid rises very rapidly asymptotically approaching infinity. The chemical consolidation composition must be pumped into the formation or zone before full curing occurs, because after the gel time, no fluid can be squeezed into formation.

In such consolidation compositions, the viscosity typically remains fairly constant until the gel time. Near the gel point, the viscosity asymptotically increases to infinity as characterized by the gel time and a universal constant as set forth in Equation (1).

$$\eta = \eta_{t=0} \frac{1}{\left(1 - \frac{t}{t_{gel}}\right)^k}$$

This gel time itself is related to the cross-linking reaction rate k, which is dependent on temperature T as shown in Equation (2).

$$k = (Ae)^{-\frac{E_a}{RT}}$$

As a result, the viscosity dependency on time and temperature near the gel point is critical. During the cross-linking reaction, there may also be a slight increase in density (shrinkage).

Resin Curing/Solidification

Solidification or cure rate is a property that effects which curable consolidation composition can be used in a given application. Cure rate of a consolidation composition depends primarily on temperature and catalyst. Catalyst used in such composition are typically metal salts and acids or mixtures thereof. The catalyst catalyze the curing process (speed it up) and can provide additional mechanical strength of the cross-linked network. The catalysts are generally Lewis acids. Exemplary catalysts include, without limitation, $AlCl_3$, $Al(SO_4)_3$, $NiCl_2$, $ZrOCl_2$, $NH_4Cl$, $Cr(CH_3COO)_3$ and o-Phosphoric acid or similar catalysts or mixture or combinations thereof. By controlling the type, amount and release of catalyst, the on set of curing and ultimate time to gel point can be controlled. Formation characteristic play a roll in the selection of appropriate consolidation composition and appropriate catalyst so that the cure rate is sufficient slow to permit formation penetration to a desired extent before the gel point of the composition is reached. The life of consolidation is governed by the resin system used and to a secondary extent by catalysts and other inorganic salts with mono-, di- and tri-valent cations at various concentrations, which impart added strength to the cured material.

Suitable Reagents

Conglomeration Composition

The aggregation, agglomeration or conglomeration compositions suitable for use in this invention include, without limitation, any composition that is capable of changing the aggregation propensity or potential and/or zeta potential of the particles of a weakly consolidated, semi consolidated or unconsolidated formation imparting to the formation a sufficient strength to reduce collapse or cave in during production at a velocity sufficient to form a cavities or a cavity surrounding a well bore in a zone of a producible formation. Exemplary examples of such compositions include, without limitation, a composition comprising a reaction product of an amine and a phosphate ester, where the coating deforms under pressure and imparts an enhanced aggregating propensity to the solid particles as disclosed in U.S. Pat. No. 7,392,847, the compositions disclosed in U.S. Pat. No. 7,350,579 (which are incorporated by reference due to the operation of the last paragraph before the claims), consolidation composition described below introduced at relatively low concentrations and with relatively low cross-linking agents so that the matrix is non-uniform and incomplete, or any other composition that change the aggregation propensity or potential and/or zeta potential of formation particles without converting the particles into a matrix having sufficient strength to resist cavitation via producing the formation at velocities above a well critical draw down pressure.

Amine and Phosphate Reaction Products

Suitable amines include, without limitation, any amine that is capable of reacting with a suitable phosphate ester to form a composition that forms a deformable coating on a metal-oxide-containing surface. Exemplary examples of such amines include, without limitation, any amine of the general formula $R^1,R^2NH$ or mixtures or combinations thereof, where $R^1$ and $R^2$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in this invention include, without limitation, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

Suitable phosphate esters include, without limitation, any phosphate ester that is capable of reacting with a suitable amine to form a composition that forms a deformable coating on a metal-oxide containing surface or partially or completely coats particulate materials. Exemplary examples of such phosphate esters include, without limitation, any phosphate esters of the general formula $P(O)(OR^3)(OR^4)(OR^5)$ or mixture or combinations thereof, where $R^3$, $R^4$, and $OR^5$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of phosphate esters include, without limitation, phosphate ester of alkanols having the general formula $P(O)(OH)_x(OR^6)_y$ where x+y=3 and are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates or mixtures or combinations thereof. Other exemplary examples of phosphate esters include, without limitation, phosphate esters of alkanol amines having the general formula $N[R^7OP(O)(OH)_2]_3$ where $R^7$ is a carbenyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine or mixtures or combinations thereof. Other exemplary examples of phosphate esters include, without limitation, phosphate esters of hydroxylated aromatics such as phosphate esters of alkylated phenols such as Nonylphenyl phosphate ester or phenolic phosphate esters. Other exemplary examples of phosphate esters include, without limitation, phosphate esters of diols and polyols such as phosphate esters of ethylene glycol, propylene glycol, or higher glycolic structures. Other exemplary phosphate esters include any phosphate ester than can react with an amine and coated on to a substrate forms a deformable coating enhancing the aggregating potential of the substrate. Other phosphorus containing compounds include polyphosphoric acid.

Suitable solid materials suitable for being coated with the compositions of this invention include, without limitation, metal oxides and/or ceramics, natural or synthetic, metals, plastics and/or other polymeric solids, solid materials derived from plants, or any other solid material that does or may find use in downhole applications or mixtures or combinations thereof. Metal oxides including any solid oxide of a metallic element of the periodic table of elements. Exemplary examples of metal oxides and ceramics include actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, ceramic structures prepared from one or more of these oxides and mixed metal oxides including two or more of the above listed metal oxides. Exemplary examples of plant materials include, without limitation, shells of seed bearing plants such as walnut shells, pecan shells, peanut shells, shells for other hard shelled seed forming plants, ground wood or other fibrous cellulosic materials, or mixtures or combinations thereof.

Surface Acidifying and Modifying Compositions

Suitable acidifying agents include, without limitation, sulfuric acid, phosphoric acid, hydrochloride acid, nitric acid, carboxylic acids, chlorated carboxylic acids, carbylsulfonic acids, where the carbyl group has between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof, or mixture or combinations thereof.

Exemplary examples of sulfonic acid type acidifying agents include, without limitation, alkysuflonic acids, arylsulfonic acids, alkarylsulfonic acids, aralkylsulfonic acids, or mixture or combinations thereof.

Exemplary examples of alkylsulfonic acids having between about between about 1 and 16 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof, or mixture or combinations thereof. Exemplary examples of alkylsulfonic acids include, without limitation, methylsulfonic acid, ethylsulfonic acid, 2-hydroxyethylsulfonic acid (OH—$CH_2CH_2$—$SO_3H$), propylsulfonic acid (all isomers), butylsulfonic acid (all isomers), pentylsulfonic acid (all isomers), hexylsulfonic acid (all isomers), heptylsulfonic acid (all isomers), octylsulfonic acid (all isomers), nonylsulfonic acid (all isomers), decylsulfonic acid (all isomers), undecylsulfonic acid (all isomers), dodecylsulfonic acid (all isomers), C13 sulfonic acid (all isomers), C14 sulfonic acid (all isomers), C15 sulfonic acid (all isomers), C16 sulfonic acid (all isomers), or mixture or combinations thereof.

Exemplary examples arylsulfonic acids include, without limitation, benzene sulfonic acid, naphthalene sulfonic acid, or mixture or combinations thereof.

Exemplary examples alkarylsulfonic acids include, without limitation, methylbenzene sulfonic acid, ethylbenzene sulfonic acid, propylbenzene sulfonic acid, pentylbenzene sulfonic acid, hexylbenzene sulfonic acid, heptylbenzene sulfonic acid, octylbenzene sulfonic acid, nonylbenzene sulfonic acid, decylbenzene sulfonic acid, undecylbenzene sulfonic acid, dodecylbenzene sulfonic acid, tridecylbenzene sulfonic acid, di and tri-alkyl substituted analogs or mixture or combinations thereof.

Exemplary examples aralkylsulfonic acids include, without limitation, phenylmethyl sulfonic acid, phenylethyl sulfonic acid, other phenylated alkyl sulfonic acids or mixture or combinations thereof.

Suitable surface modifying agents include, without limitation, primary, secondary or tertiary amines, primary, secondary, or tertiary phosphines, or mixtures or combinations thereof. Preferred amines include, without limitation, primary amines having between about between about 1 and 40 carbon atoms and the required hydrogen atoms to satisfy the valence and where one or more of the carbon atoms can be replaced by one or more hetero atoms selected from the group consisting of, boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof, or mixture or combinations thereof.

Suitable exchange agents include, without limitation, any phase transfer agent. Exemplary examples of exchange agents useful in this invention include, without limitation, ammonium salts having the general formula $R^1R^2R^3R^4N^+Z^-$, phosphonium salts having the general formula $R^1R^2R^3R^4P^+Z^-$, or mixtures or combinations thereof, where $R^1$, $R^2$, $R^3$, and $R^4$ are independently a hydrogen atom or a carbyl group having Law between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof and $Z^-$ is $OH^-$, $OR^-$, $F^-$, $Cl^-$, $Br^-$, $I^-$, $HSO_4^-$, $H_2PO_4^-$, $HSO_3^-$, $H_2PO_3^-$, or similar counterions or mixtures or combinations thereof, where R a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

Exemplary examples of phosphonium salts useful in this invention include, without limitation, phosphonium salts having the general formula $R^1R^2R^3R^4P^+Z^-$, where $R^1$, $R^2$, $R^3$, and $R^4$ are independently a hydrogen atom, an alkyl group, an aryl group, an aralkyl group, or an alkaryl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof and $Z^-$ is $OH^-$, $OR^-$, $F^-$, $Cl^-$, $Br^-$, $I^-$, $HSO_4^-$, $H_2PO_4^-$, $HSO_3^-$, $H_2PO_3^-$, or similar counterions or mixtures or combinations thereof, where R a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

Resin Consolidation Compositions

Thermosetting resins change irreversibly under the influence of heat from a fusible and soluble material into an infusible and insoluble due to the formation of a covalently cross-linked, thermally stable network. Thermosetting polymers comprise relatively low molecular chains (MW<<10000). After curing or crosslinking, the chains are chemically linked together into a network that generally constitutes as single macro-molecular assembly. These chemical bonds or cross-links can be covalent bonds, ionic bonds, hydrogen bonds, and/or electrostatic interactions. All such bonds are subject to break down due to the application of heat or due to chemical interactions or reactions. However, break down conditions are generally severe because bond breaking is necessary. Exemplary thermosetting resins include, without limitation phenolic resins (reaction products of formaldehyde and a phenolic compound), amino resins (reaction of formaldehyde with urea or melamine), polyester resins, epoxy resins, vinyl ester resins, polyurethane resins, alkyl resins or mixtures or combinations thereof. Thermosetting resins are known to be stable for indefinite periods of time over wide ranges of temperature. They are generally chemically inert to wellbore fluids, rocks and environmentally safe. Thermosetting resins form hard plastic materials, which can seal or consolidate the formation or zone. Because cure or solidification times are generally short in oil well applications, treatments generally take only a few hours. Thermoset resins cross-linked thermally and/or catalytically form substantially infusible or insoluble materials, which do not soften on reheating. When cross-linked and cured, the thermoset polymers are strong, hard and tough.

Thermoplastic resins and thermoplastic elastomers soften and flow when heat and pressure are applied, which is a reversible process. Thermoplastic polymers comprise chains of monomeric building blocks having a relatively high molecular weight (MW>10,000). The resins are held together by physical bonds between the chains forming a cohesive polymeric matrix. These physical bonds are relatively easily broken by heating or by dissolving. Thermoplastics include, without limitation, polyolefins, for example poly alpha olefins, random and/or block copolymer of olefins (where copolymer means two or more monomers comprise the polymer backbone), random and/or block copolymers of an olefin and a diene, silicon thermoplastic resins and thermoplastic elastomers, other thermoplastic resins and thermoplastic elastomer and mixtures or combinations thereof. Exemplary examples include, without limitation, polyethylene (PE), polypropylene (PP), polystyrene (PS), poly vinyl chloride (PVC), polyvinylpyridine, polyalkatedstyrene, polyhalogenatedstyrene, styrene butadiene blocked copolymers, styrene isoprene blocked copolymers, styrene butadiene isoprene copolymers, or the like or mixtures or combinations thereof.

DETAILED DESCRIPTION OF THE DRAWINGS

Chemical Sand Control

Referring now to FIG. 1, an embodiment of the methods and systems for sand control of this invention, generally 100, is shown to include a well bore 102 including a casing or liner 104 cemented in the well bore 102 by a cement layer 106. The well bore 102 includes a treatment packer 108 surrounding production tubing or a working string 110. Shown here, the well bore 102 extends through a subterranean formation 112 including a first zone 114, a second zone 116, a third zone 118 and a fourth zone 120. The second zone 116 and the fourth zone 120 are the zones to be treated. The second zone 116 includes perforations 122 through the casing or liner 104 and the cement layer 106 into the second zone 116, while the fourth zone 120 includes perforations 124 through the casing or liner 104 and the cement layer 106 into the fourth zone 120. An effective amount of an aggregating, agglomerating or conglomerating composition is injected into the well bore 102 through the production tubing 110 and into the zones 116 and 120 through their respective perforations 122 and 124 forming injection jets 126 and 128, respectively. The composition penetrates into the zones 116 and 120 to form conglomerated regions 130 and 132 within their respective zones 116 and 120. The effective amount is sufficient to alter an aggregation potential and/or zeta potential of surfaces of zones 116 and 120 and formation particulate within the regions 130 and 132 resulting in a reduction, substantial elimination or elimination of co-produced formation particulate such as sand, grains and/or fines. After the conglomeration, the conglomerated zones can produce hydrocarbons and/or liquids at a higher substantially sand free rate and/or a higher sand free rate, thus, maximizing sand free production rates of the formation and the treated zones.

Enhanced Gravel or Fracture Packing

Figure 2:
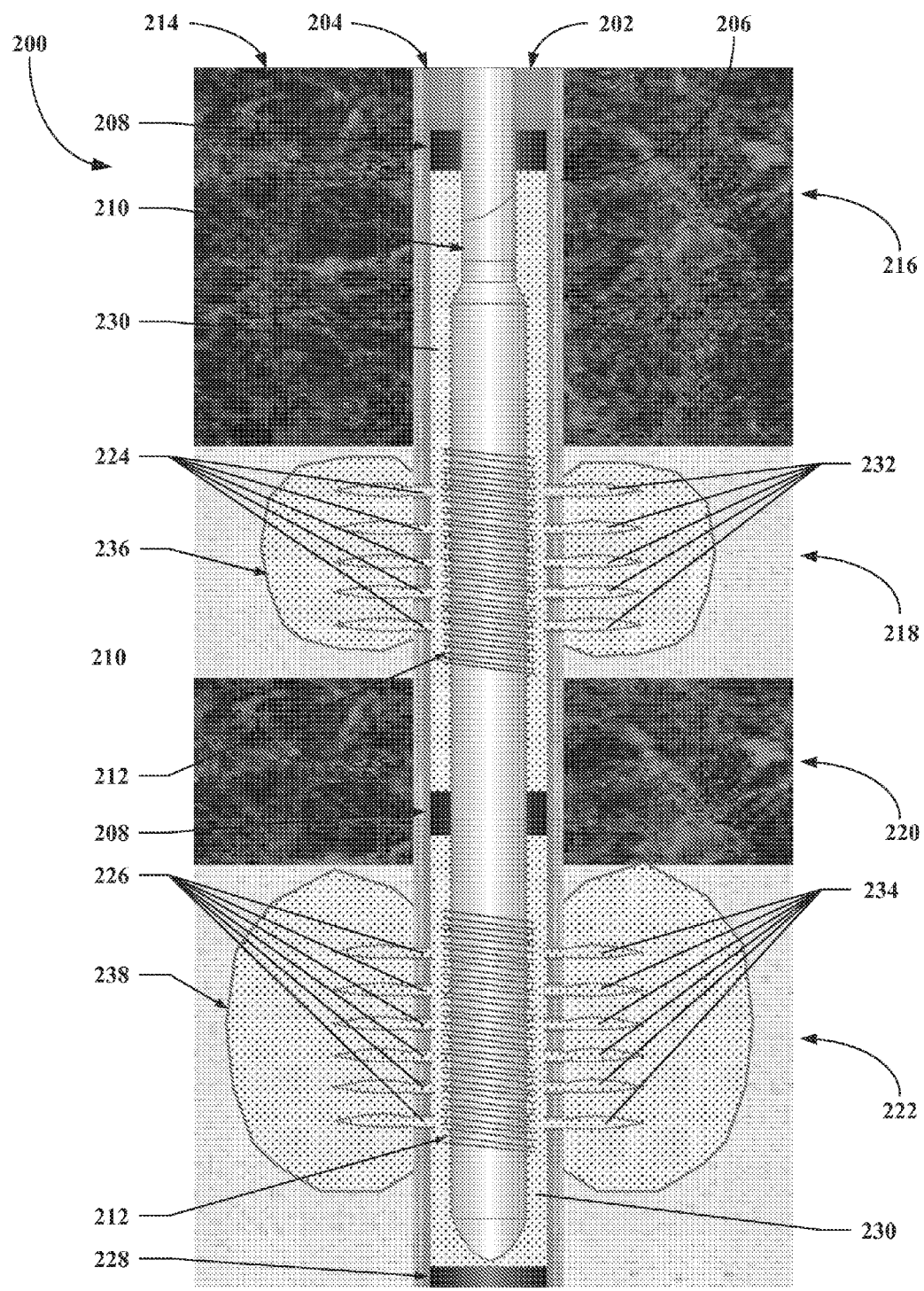
FIG. 2 depicts an embodiment of a method and system for treating two zones of a producible formation of a cased bore hole through perforations with a gravel or fracture pack through production tubing including screens, where the treatment also includes before, during and/or after treatment with an aggregating, agglomerating or conglomerating composition of this invention.

Referring now to FIG. 2, an embodiment of methods and systems for gravel packing and fracture packing of this invention, generally 200, is shown to include a well bore 202 including a casing or liner 204 cemented in the well bore 202 by a cement layer 206. The well bore 202 includes treatment packers 208 surrounding production tubing or a working string 210 designed to isolate the zone into which gravel and treating compositions are to be injected. The production tubing or working string 210 includes gravel or fracturing packing screens 212. Shown here, the well bore 202 extends through a subterranean formation 214 including a first zone 216, a second zone 218, a third zone 220 and a fourth zone 222. The second zone and the fourth zones 218 and 222 are zones to be treated. The second zone 218 includes perforations 224 through the liner 204 and the cement layer 206 into the zone 218, while the fourth zone 222 includes perforations 226 through the liner 204 and the cement layer 206 into the zone 222. The well bore 202 can optionally include a mechanical barrier 228 disposed below the zone 222. Gravel 230 associated with the gravel or fracture pack is injected into the well bore 202 through the production tubing 210 and the screens 212 into the zones 218 and 222 through their respective perforations 224 and 226 forming injection jets 232 and 234, respectively. The gravel 230 penetrates into the zones 218 and 222 to form gravel packed regions 236 and 238 within their respective zones 218 and 222. Before, during or after gravel packing or fracturing packing, an effective amount of an aggregation, agglomeration or conglomeration composition is injected into the well bore 202 through the production tubing 210 and the screens 212 into the zones 218 and 222 through their respective perforations 224 and 226 and the jets 232 and 234, respectively. The composition penetrates into the regions 234 and 236 to conglomerate the regions 234 and 236, respectively. The effective amount is sufficient to alter an aggregation potential and/or zeta potential of the gravel 228, the surfaces of zones 218 and 222 and formation particulate in each zone 218, 222 resulting in a reduction, substantial elimination or elimination of the co-production of formation particulate including gravel, sand, grains and/or fines. After the conglomeration, the conglomerated formation can produce hydrocarbons and/or liquids at a higher substantially sand free rate and/or a higher sand free rate, thus, maximizing sand free production rates of the formation or zone.

Enhanced Expandable Screen Production in Open Hole Formation

Figure 3:
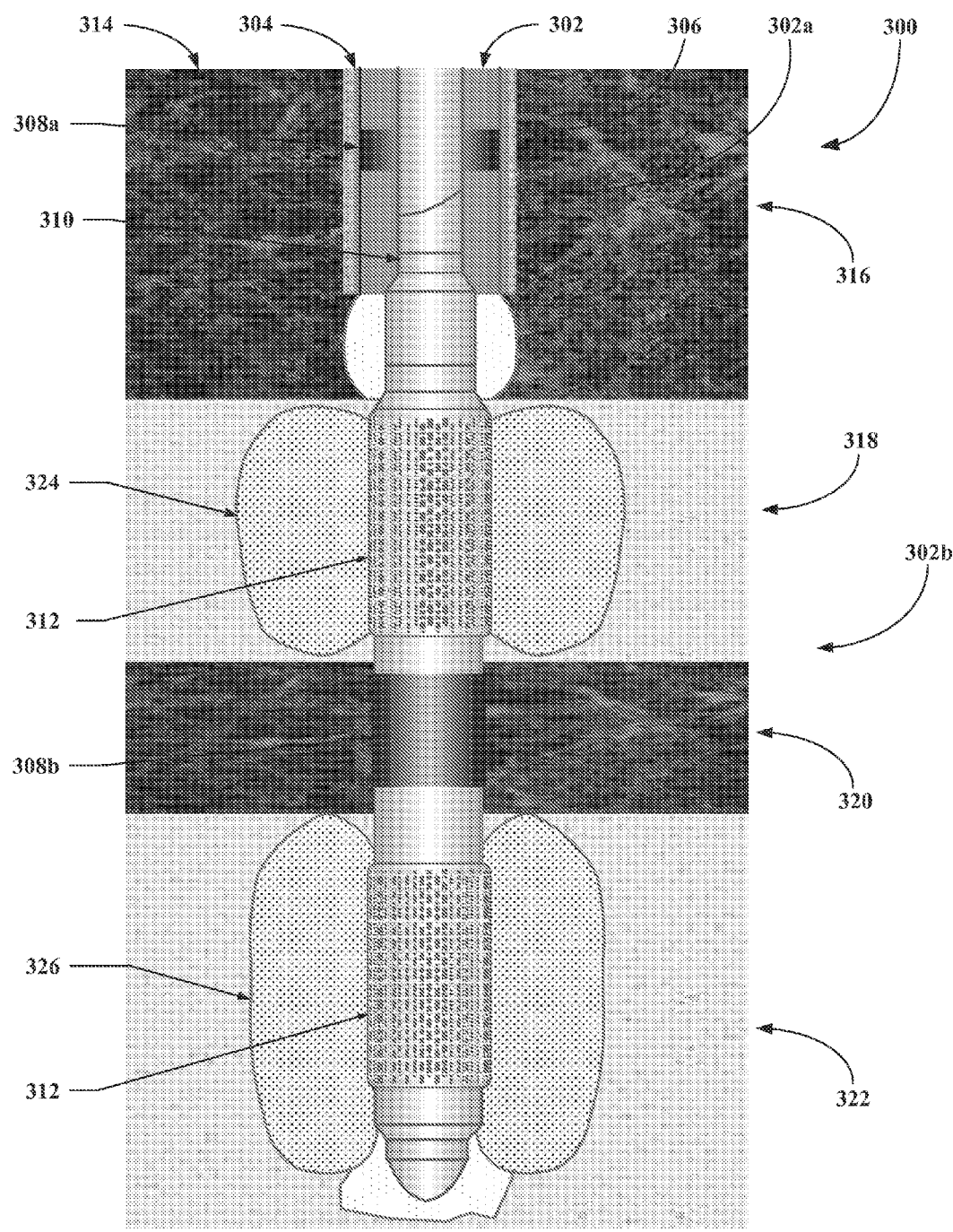
FIG. 3 depicts an embodiment of a method and system for treating two zones of a producible formation of an open bore hole through expandable screens with an aggregating, agglomerating or conglomerating composition of this invention.

Referring now to FIG. 3, an embodiment of the methods and systems for enhancing production of an open formation using expandable screens of this invention, generally 300, is shown to include a well bore 302 including a casing or liner 304 cemented in an upper portion 302a of the well bore 302 by a cement layer 306. The well bore 302 includes a treatment packer 308a surrounding production tubing or a working string 310 disposed in the upper portion 302a of the well bore 302. The production tubing or working string 310 includes expandable screens 312 disposed in an open or lower portion 302b of the well bore 302. Shown here, the well bore 302 extends through a subterranean formation 314 including a first zone 316, a second zone 318, a third zone 320 and a fourth zone 322. The second zone and the fourth zones 318 and 322 are zone to be treated. The expandible screens 312 are disposed within the second zone 318 and the fourth zone 322. The well bore 302 is also includes a second packer 308b for isolating the zone 318 and 322. An effective amount of an aggregation, agglomeration or conglomeration composition is injected into the lower portion 302b of the well bore 302 through the production tubing 310 and the expandible screens 312 into the zones 318 and 322. The composition penetrates into the zones 318 and 322 to form conglomerated regions 324 and 326, respectively. The effective amount is sufficient to alter an aggregation potential and/or zeta potential of surfaces of zones 318 and 322 and formation particulate in each zone 318, 322 resulting in a reduction, substantial elimination or elimination of the co-production of formation particulate including sand, grains and/or fines. After the conglomeration, the conglomerated formation can produce hydrocarbons and/or liquids at a higher substantially sand free rate and/or a higher sand free rate, thus, maximizing sand free production rates of the formation or zone.

Enhanced Expandable Screen Production in Cased Hole Formation

Figure 4:
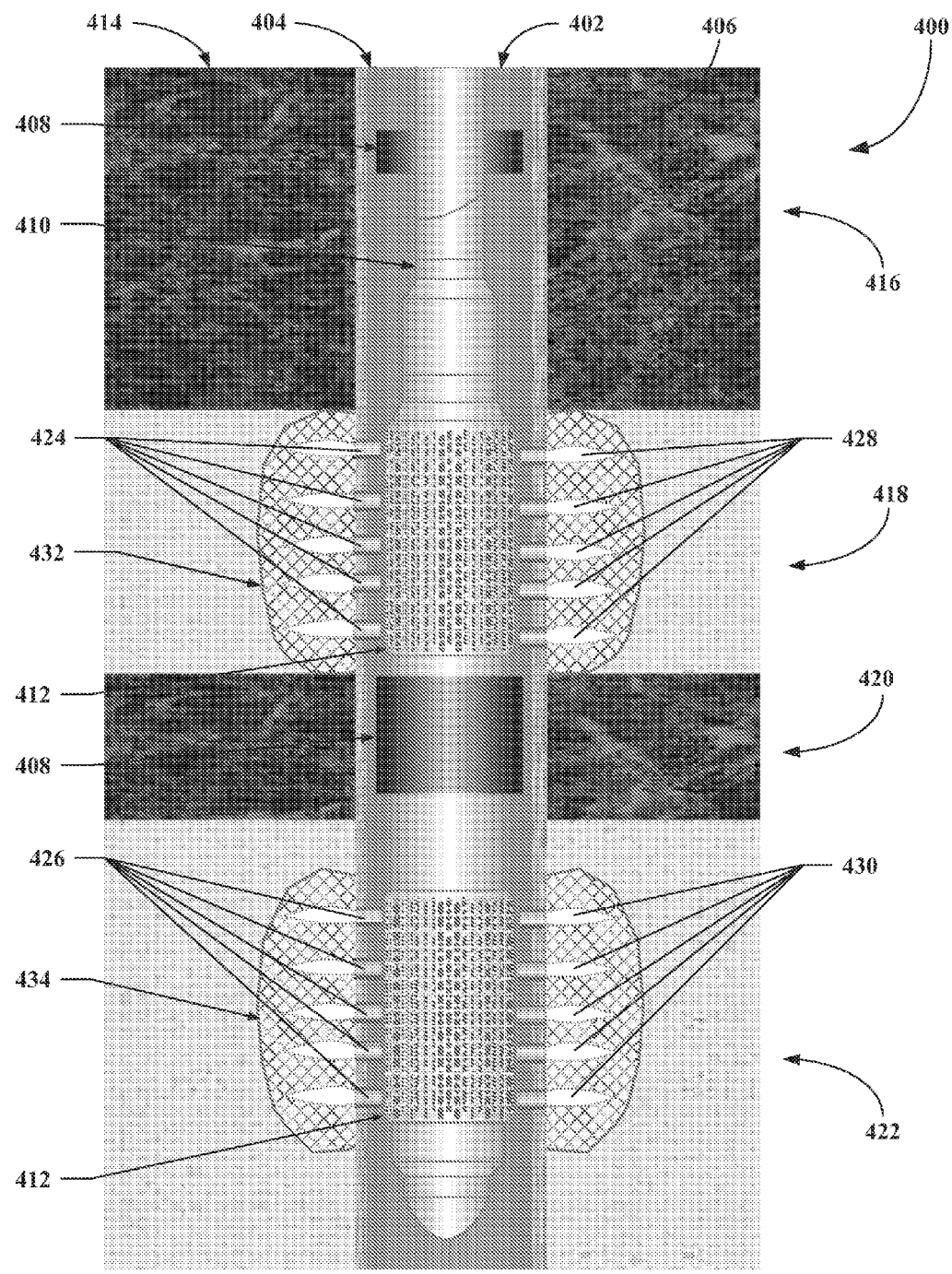
FIG. 4 depicts an embodiment of a method and system for treating two zones of a producible formation of a cased bore hole through expandable screens and perforations with an aggregating, agglomerating or conglomerating composition of this invention.

Referring now to FIG. 4, an embodiment of the methods and systems for enhancing production of a cased formation using expandable screens of this invention, generally 400, is shown to include a well bore 402 including a casing or liner 404 cemented in the well bore 402 by cement layer 406. The well bore 402 includes treatment packers 408 surrounding production tubing or a working string 410. The production tubing or working string 410 includes expandable screens 412 disposed in the well bore 402. Shown here, the well bore 402 extends through a subterranean formation 414 including a first zone 416, a second zone 418, a third zone 420 and a fourth zone 422. The second zone and the fourth zones 418 and 422 are zone to be treated. The second zone 418 includes perforations 424 through the liner 404 and the cement layer 406 into the zone 418, while the fourth zone 422 includes perforations 426 through the liner 404 and the cement layer 406 into the zone 422. An effective amount of an aggregation, agglomeration or conglomeration composition is injected into a well bore through the production tubing 410 and into the zones 418 and 422 through their respective perforations 422 and 424 forming injection jets 428 and 430, respectively. The composition penetrates into the zones 418 and 422 to form conglomerated regions 432 and 434, respectively. The effective amount is sufficient to alter an aggregation potential and/or zeta potential of surfaces of zones 418 and 422 and formation particulate in each zone 418, 422 resulting in a reduction, substantial elimination or elimination of the co-production of formation particulate including sand, grains and/or fines. After the conglomeration, the conglomerated formation can produce hydrocarbons and/or liquids at a higher substantially sand free rate and/or a higher sand free rate, thus, maximizing sand free production rates of the formation or zone.

Enhanced Stand Alone Screen Production in Open Hole Formation

Figure 5:
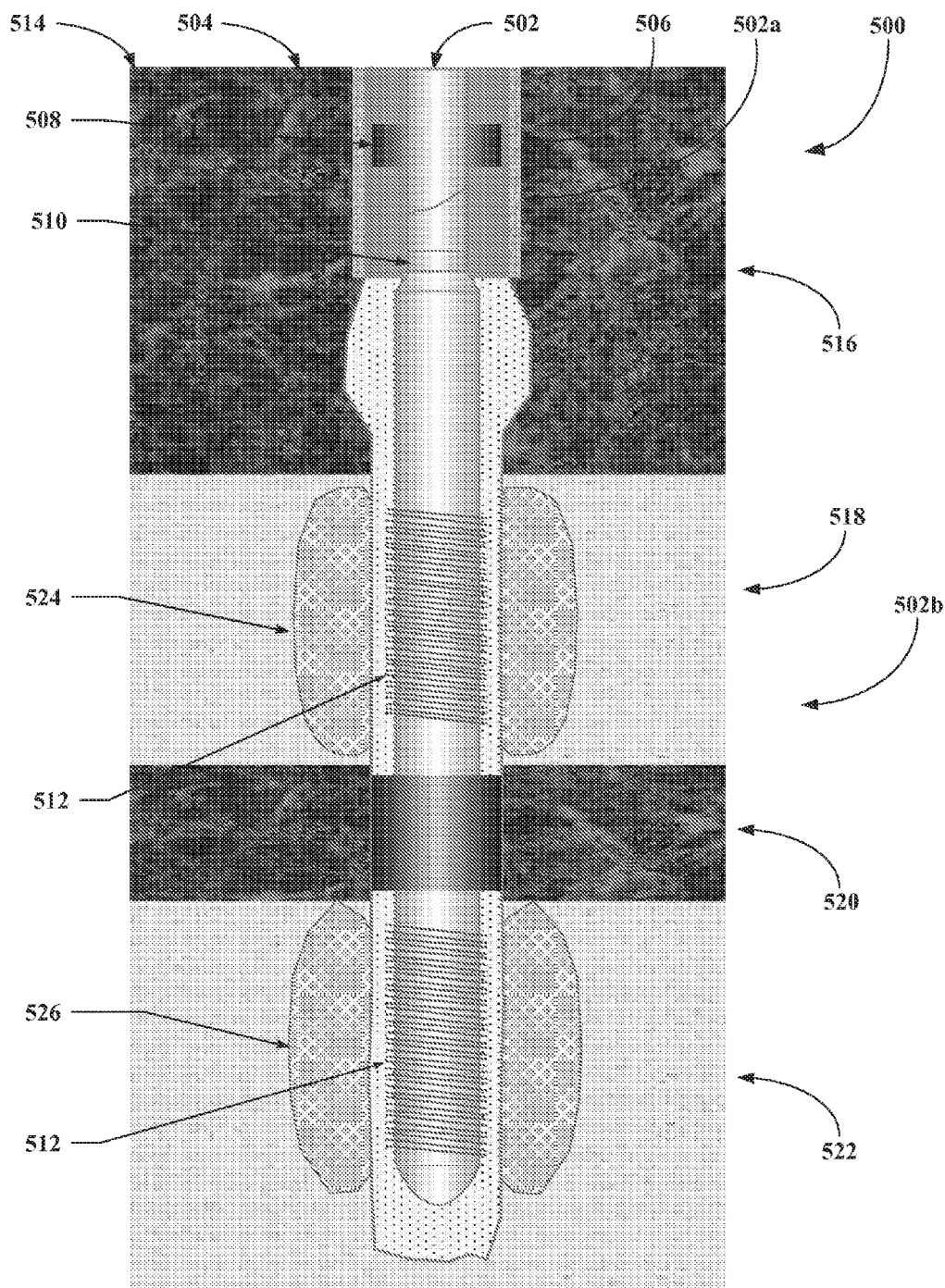
FIG. 5 depicts an embodiment of a method and system for treating two zones of a producible formation of an open bore hole through stand alone screens with an aggregating, agglomerating or conglomerating composition of this invention.

Referring now to FIG. 5, an embodiment of a methods and systems for enhancing production of an open formation using stand alone screens of this invention, generally 500, is shown to include a well bore 502 including a casing or liner 504 cemented in an upper portion 502a of the well bore 502 by a cement layer 506. The well bore 502 includes a treatment packer 508a surrounding production tubing or a working string 510. The production tubing or working string 510 includes expandable screens 512 disposed in an open or lower portion 502b of the well bore 502. Shown here, the well bore 502 extends through a subterranean formation 514 including a first zone 516, a second zone 518, a third zone 520 and a fourth zone 522. The second zone and the fourth zones 518 and 522 are zone to be treated. The well bore 502 is also includes a second packer 508b for isolating the zone 518 and 522. An effective amount of an aggregation, agglomeration or conglomeration composition is injected into a well bore 502 through the production tubing 510 and into the zones 518 and 522 through their respective screens 512 into the zones 518 and 522 to form conglomerated regions 524 and 526, respectively. The effective amount is sufficient to alter an aggregation potential and/or zeta potential of surfaces of zones 518 and 522 and formation particulate in each zone 518, 522 resulting in a reduction, substantial elimination or elimination of the co-production of formation particulate including sand, grains and/or fines. After the conglomeration, the conglomerated formation can produce hydrocarbons and/or liquids at a higher substantially sand free rate and/or a higher sand free rate, thus, maximizing sand free production rates of the formation or zone.

Enhanced Stand Alone Screen Production in Cased Hole Formation

Figure 6:
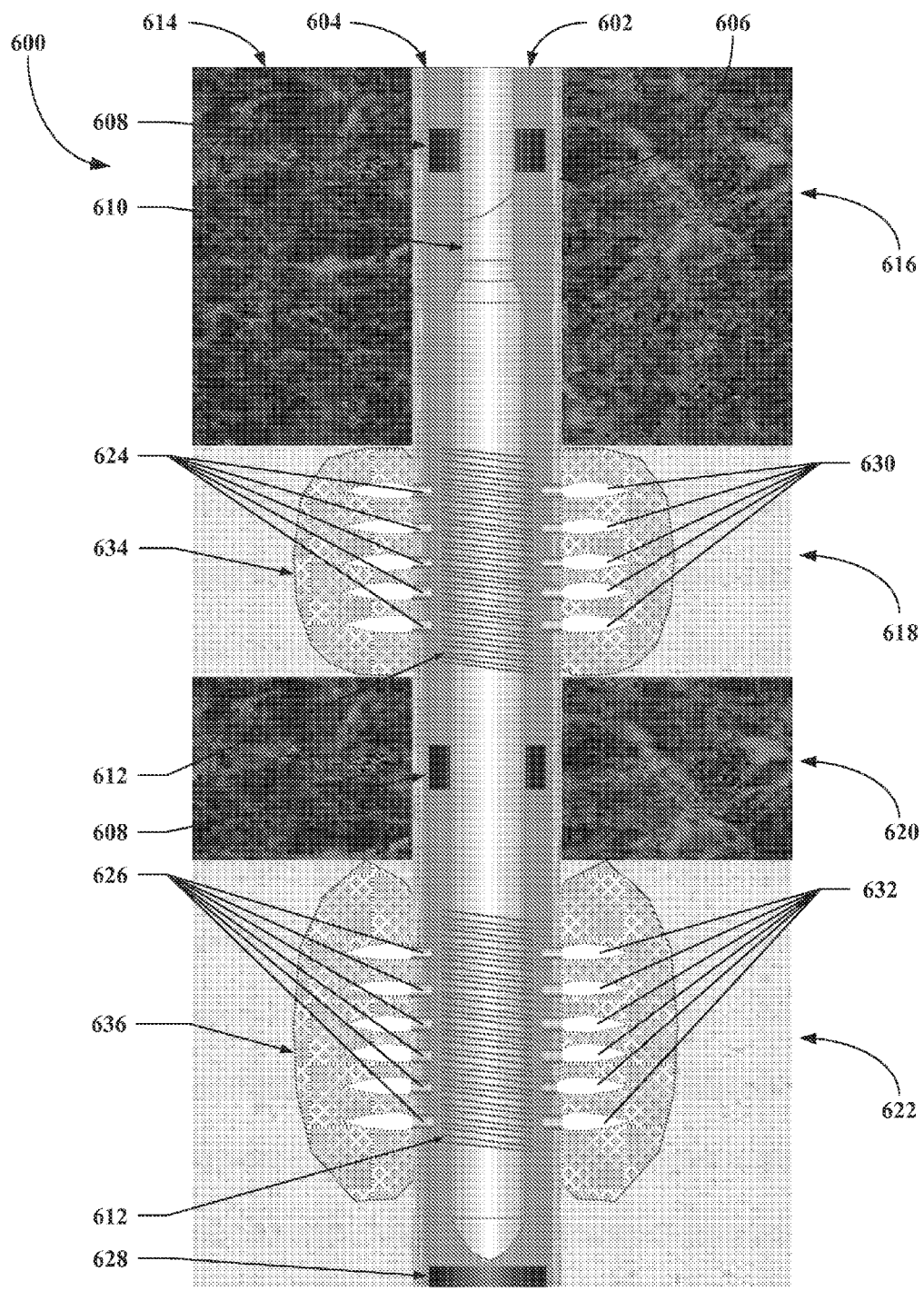
FIG. 6 depicts an embodiment of a method and system for treating two zones of a producible formation of a cased bore hole through stand alone screens and perforations with an aggregating, agglomerating or conglomerating composition of this invention.

Referring now to FIG. 6, an embodiment of a methods and systems for enhancing production of a cased formation using stand alone screens of this invention, generally 600, is shown to include a well bore 602 including a casing or liner 604 cemented in the well bore 602 by cement layer 606. The well bore 602 includes treatment packers 608 surrounding production tubing or a working string 610. The production tubing or working string 610 includes stand alone screens 612. Shown here, the well bore 602 extends through a subterranean formation 614 including a first zone 616, a second zone 618, a third zone 620 and a fourth zone 622. The second zone and the fourth zones 618 and 622 are zone to be treated. The second zone 618 includes perforations 624 through the liner 604 and the cement layer 606 into the zone 618, while the fourth zone 622 includes perforations 626 through the liner 604 and the cement layer 606 into the zone 622. The well bore 602 can optionally include a mechanical barrier 628 disposed below the zone 622. An effective amount of an aggregation, agglomeration or conglomeration composition is injected into a well bore through the production tubing 610 and into the zones 618 and 622 through their respective screens 612 and perforations 624 and 626 forming injection jets 630 and 632, respectively. The composition penetrates into the zones 618 and 622 to form conglomerated regions 634 and 636, respectively. The effective amount is sufficient to alter an aggregation potential and/or zeta potential of surfaces of zones 618 and 622 and formation particulate in each zone 618, 622 resulting in a reduction, substantial elimination or elimination of the co-production of formation particulate including sand, grains and/or fines. After the conglomeration, the conglomerated formation can produce hydrocarbons and/or liquids at a higher substantially sand free rate and/or a higher sand free rate, thus, maximizing sand free production rates of the formation or zone.

Perforation of Cased Hole Formation Using Jointed Pipe Strings

Figure 7:
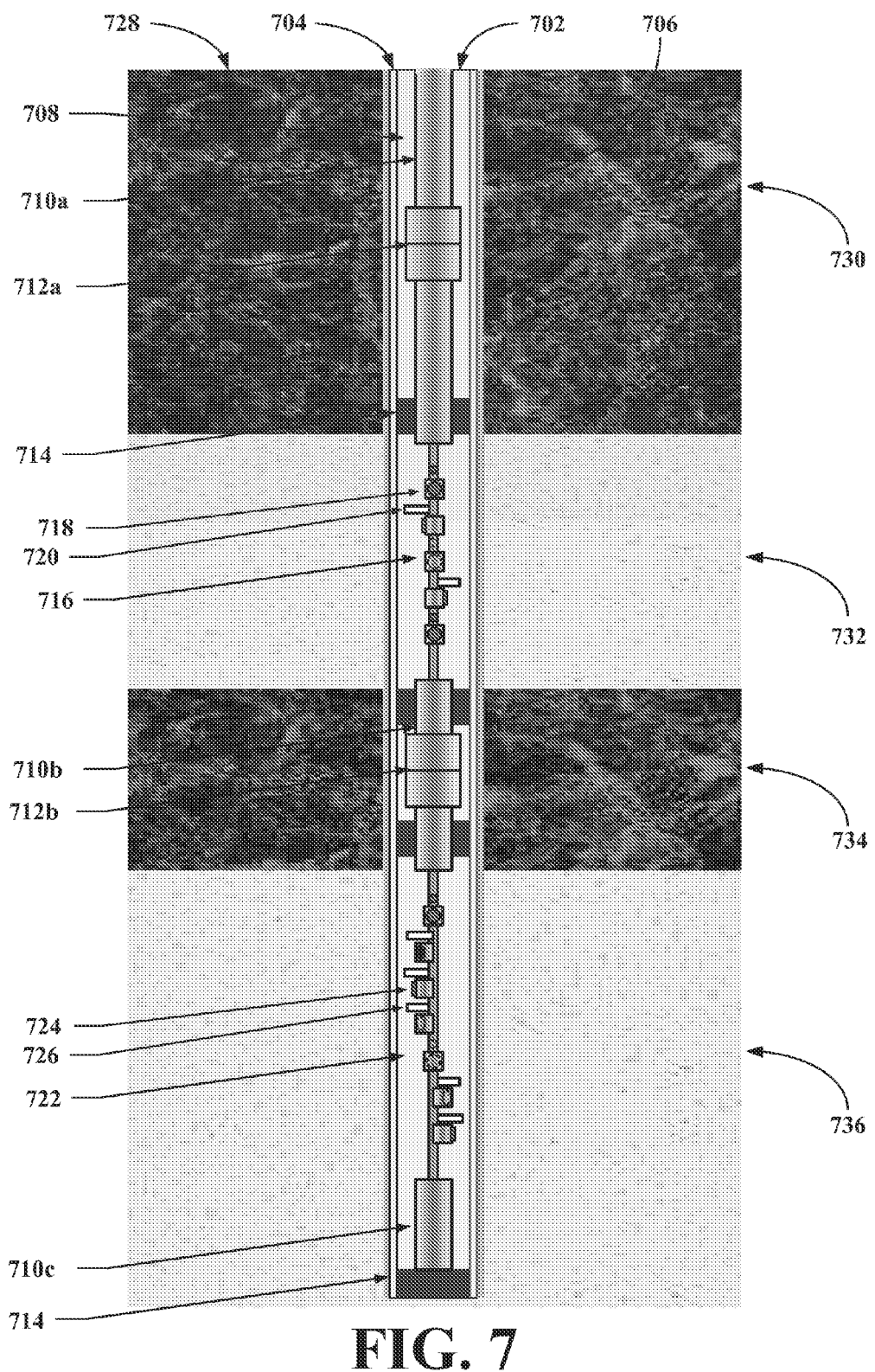
FIG. 7 depicts jointed completion sting including two sets of perforation guns for perforating a cased bore hole and circulation control valves to inject a an aggregating, agglomerating or conglomerating composition of this invention during and/or after perforation.

Referring now to FIG. 7, an embodiment of the methods and systems for completion of cased formation using jointed complete string, control, generally 700, is shown to include a well bore 702 including a casing or liner 704 cemented in the well bore 702 by cement layer 706. A jointed completion string 708 is shown run into the bore hole 702. The complete string 708 includes a first pipe section 710a connected to a second pipe section 710b via a joint 712a and to a third pipe section 710c via a joint 712b. The string 708 includes a plurality of injection packers 714. The string 708 include a first perforation gun section 716 having a plurality of perforation guns 718 and control valves 720 arranged at right angles one to another. The string 708 also includes a second perforation gun section 722 having a plurality of perforation guns 724 and control valves 726 arranged at an angle of 45° one to another. Shown here, the well bore 702 extends through a subterranean formation 728 including a first zone 730, a second zone 732, a third zone 734 and a fourth zone 736. The first perforation gun section 716 is disposed within the second zone 728 to form perforations into the second zone 728. The second perforation gun section 720 is disposed within the fourth zone 728 to form perforations into the fourth zone 732. The packers 714 are positioned to isolated the zones.

After perforation, an effective amount of an aggregation, agglomeration or conglomeration composition is injected into a well bore through the production tubing 708 and into the zones 732 and 736. The composition will penetrates into the perforated zones 732 and 736 to form conglomerated regions herein (not shown). The effective amount is sufficient to alter an aggregation potential and/or zeta potential of surfaces of regions and formation particulate in each region resulting in a reduction, substantial elimination or elimination of the co-production of formation particulate including sand, grains and/or fines. After the conglomeration, the conglomerated formation can produce hydrocarbons and/or liquids at a higher substantially sand free rate and/or a higher sand free rate, thus, maximizing sand free production rates of the formation or zone.

Perforation of Cased Hole Formation Using Coiled Tubing

Figure 8:
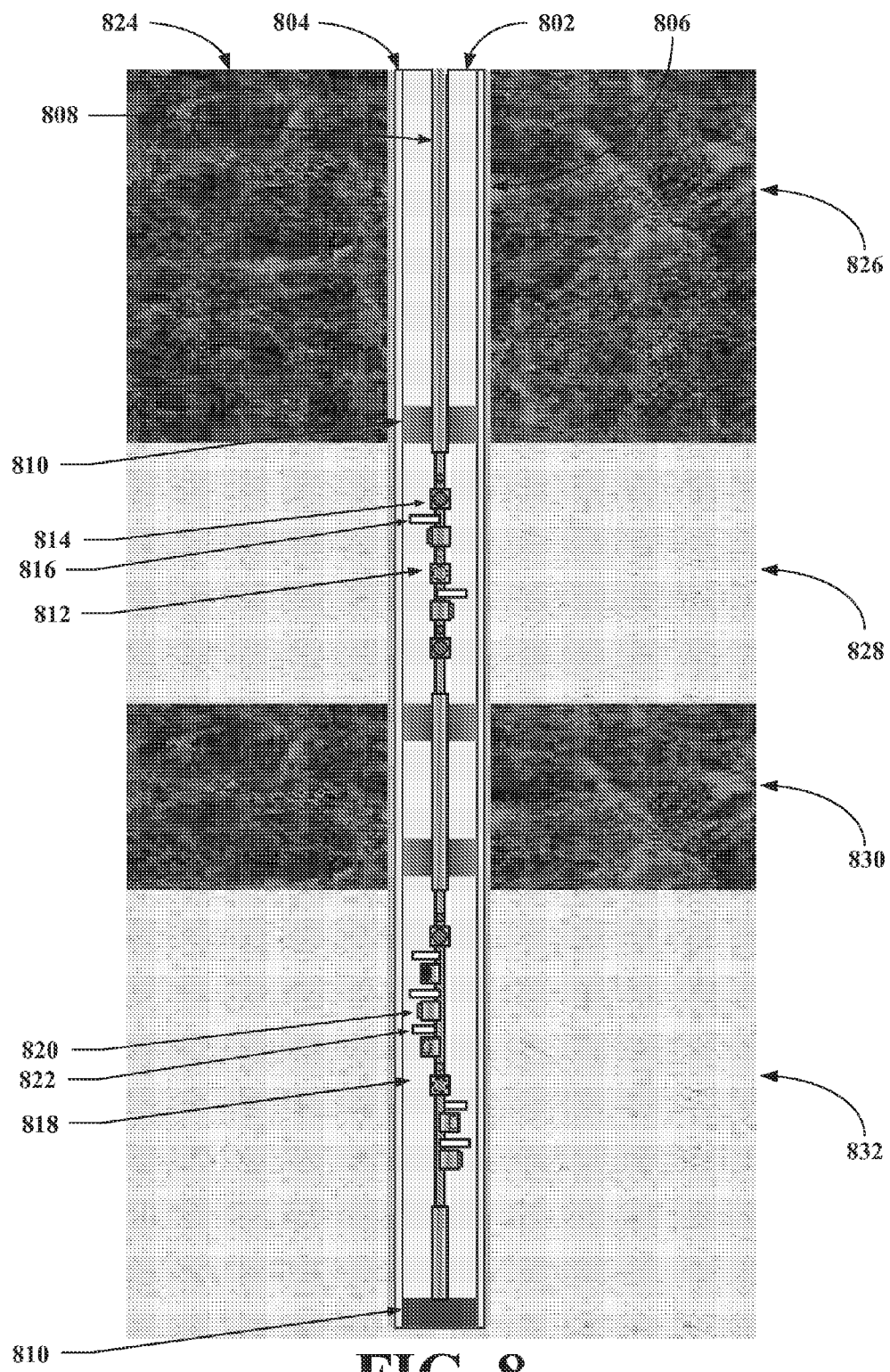
FIG. 8 depicts coiled tubing completion sting including two sets of perforation guns for perforating a cased bore hole and circulation control valves to inject a an aggregating, agglomerating or conglomerating composition of this invention during and/or after perforation.

Referring now to FIG. 8, an embodiment of the methods and systems for completion of cased formation using coiled tubing, control, generally 800, is shown to include a well bore 802 including a casing or liner 804 cemented in the well bore 802 by cement layer 806. Coiled tubing 808 is shown run into the bore hole 802. The tubing 808 includes a plurality of injection packers 810. The tubing 808 include a first perforation gun section 812 having a plurality of perforation guns 814 and control valves 816 arranged at right angles one to another. The string 808 also includes a second perforation gun section 818 having a plurality of perforation guns 820 and control valves 822 arranged at an angle of 45' one to another. Shown here, the well bore 802 extends through a subterranean formation 824 including a first zone 826, a second zone 828, a third zone 830 and a fourth zone 832. The first perforation gun section 816 is disposed within the second zone 828 to form perforations into the second zone 828. The second perforation gun section 820 is disposed within the fourth zone 828 to form perforations into the fourth zone 832. The packers 814 are positioned to isolated the zones.

After perforation, an effective amount of an aggregation, agglomeration or conglomeration composition is injected into a well bore through the production tubing 808 and into the zones 828 and 832. The composition will penetrates into the perforated zones 828 and 832 to form conglomerated regions herein (not shown). The effective amount is sufficient to alter an aggregation potential and/or zeta potential of surfaces of regions and formation particulate in each region resulting in a reduction, substantial elimination or elimination of the co-production of formation particulate including sand, grains and/or fines. After the conglomeration, the conglomerated formation can produce hydrocarbons and/or liquids at a higher substantially sand free flow rate and/or a higher sand free flow rate, thus, maximizing sand free flow rate or sand free production rates in the case of producible formations or zones or sand free injection rates in the case of injection formations or zones.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for treating a formation comprising:
   injecting an effective amount of an aggregating, agglomerating or conglomerating composition into a weakly consolidated, semi-consolidated or unconsolidated formation, one zone or a plurality of zones of a weakly consolidated, semi-consolidated or unconsolidated formation, or a long interval or a plurality of long intervals of a weakly consolidated, semi-consolidated or unconsolidated formation,
   where:
   the composition comprises a reaction product of an amine and a phosphate ester,
   the amine is of the general formula R1,R2NH or mixtures or combinations thereof, where R1 and R2 are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof, and
   the phosphate esters include phosphate esters of the general formula P(O)(OR3)(OR4)(OR5), polymers thereof, or mixture or combinations thereof, where R3, R4, and OR5 are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof, and
   where the amine is selected from the group consisting of aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, and mixtures or combinations thereof, and
   where the composition alters an aggregation or zeta potential of formation surfaces and/or formation particulate so that the particles tend to aggregate with sufficient strength to reduce or eliminate formation collapse or cave in during subsequent above critical draw down pressure production and to increase a maximum sand free flow rate in producible formations or to reduce a flow of formation particulate out of producible formations or into injection formations.

2. The method of claim 1, wherein the formation is a producible formation and the composition increases a sand free production rate.

3. The method of claim 1, wherein the injecting is directly into a formation.

4. The method of claim 1, wherein the injecting is through perforations in a liner or casing into one zone or a plurality of zone in the formation.

5. The method of claim 4, wherein the zones are spaced apart along the formation.

6. The method of claim 1, wherein the composition comprising (1) a particulate metal oxide-containing solid surface acidifying agent; (2) a particulate metal oxide-containing solid surface modifying agent; optionally (3) a particulate metal oxide-containing solid surface exchange agent; optionally (4) an aggregation enhancing agent; optionally (5) a thickening agent; and optionally (6) a fluid carrier.

7. The method of claim 1, further comprising:
   pre-treating, in-situ treating and/or post treating of the formation, an interval within the formation or zones within the formation with an effective amount of an aggregating, agglomerating or conglomerating composition sufficient to alter an aggregation potential and/or zeta potential of the formation or zone surfaces and formation particulate resulting in a reduction, substantial elimination or elimination of the co-production of formation particulate including sand, grains and/or fines.

8. The method of claim 1, wherein the composition forms a partial or complete coating on formation surfaces and on surfaces of formation particulate including formation fines.

9. The method of claim 6, wherein the composition forms a partial or complete coating on formation surfaces and on surfaces of formation particulate including formation fines.

* * * * *